(12) United States Patent
Kobayashi et al.

(10) Patent No.: US 9,869,378 B2
(45) Date of Patent: Jan. 16, 2018

(54) LOAD APPLICATION DEVICE

(71) Applicant: NHK SPRING CO., LTD., Kanagawa (JP)

(72) Inventors: Takao Kobayashi, Nagano (JP); Takahiro Ito, Nagano (JP); Yoshiyuki Takahashi, Nagano (JP); Kazuhito Hiraoka, Kanagawa (JP)

(73) Assignee: NHK SPRING CO., LTD., Yokahama-shi, Kanagawa (JP)

( * ) Notice: Subject to any disclaimer, the term of this patent is extended or adjusted under 35 U.S.C. 154(b) by 35 days.

(21) Appl. No.: 14/772,681

(22) PCT Filed: Feb. 6, 2014

(86) PCT No.: PCT/JP2014/052810
§ 371 (c)(1),
(2) Date: Sep. 3, 2015

(87) PCT Pub. No.: WO2014/123204
PCT Pub. Date: Aug. 14, 2014

(65) Prior Publication Data
US 2016/0153529 A1    Jun. 2, 2016

(30) Foreign Application Priority Data

Feb. 7, 2013    (JP) ................................. 2013-022631

(51) Int. Cl.
*F16H 7/08*    (2006.01)
*F16H 7/22*    (2006.01)
*F01L 1/18*    (2006.01)

(52) U.S. Cl.
CPC .................. *F16H 7/08* (2013.01); *F01L 1/18* (2013.01); *F16H 2007/081* (2013.01); *F16H 2007/0804* (2013.01); *F16H 2007/0893* (2013.01)

(58) Field of Classification Search
CPC ................. F16H 2007/081; F16H 7/08; F16H 2007/0872; F16H 2007/0893; F16H 2007/0874
USPC .................................. 474/110, 135, 111, 101
See application file for complete search history.

(56) References Cited

U.S. PATENT DOCUMENTS

| | | | | |
|---|---|---|---|---|
| 1,701,820 A | * | 2/1929 | Morse | F16H 7/129 16/DIG. 34 |
| 2,130,571 A | * | 9/1938 | Weller | F16H 7/0848 474/111 |
| 3,148,555 A | * | 9/1964 | Peras | F16H 7/08 474/111 |
| 3,358,522 A | * | 12/1967 | Poyser | F16H 7/08 474/111 |
| 4,371,360 A | * | 2/1983 | Ojima | F16H 7/0848 474/111 |

(Continued)

*Primary Examiner* — Henry Liu
(74) *Attorney, Agent, or Firm* — Greer, Burns & Crain, Ltd.

(57) ABSTRACT

A load-applying device is provided that includes a spiral spring that is formed from a thin strip that is wound multiple times in a spiral shape; a movable body; and a fixing member. The spiral spring is disposed between the movable body and the fixing member, in a manner capable of performing a diameter reduction operation and a diameter expansion operation, and an outer-circumference part of the spiral spring contacting the movable body and the fixing member directly, or indirectly.

14 Claims, 19 Drawing Sheets

(56) References Cited

U.S. PATENT DOCUMENTS

| | | | | |
|---|---|---|---|---|
| 4,878,885 A * | 11/1989 | Brandenstein | F16H 7/1218 | 474/135 |
| 4,906,222 A * | 3/1990 | Henderson | F16H 7/1218 | 474/135 |
| 4,938,734 A * | 7/1990 | Green | F16H 7/1218 | 474/135 |
| 4,971,589 A * | 11/1990 | Sidwell | F16H 7/1218 | 474/117 |
| 4,976,659 A * | 12/1990 | Hans | F16H 7/0834 | 474/111 |
| 4,990,123 A * | 2/1991 | Krude | F16H 9/10 | 474/110 |
| 5,176,581 A * | 1/1993 | Kumm | F16H 9/14 | 474/110 |
| 5,277,667 A * | 1/1994 | Gardner | F16H 7/1281 | 474/135 |
| 5,354,242 A * | 10/1994 | St. John | F16H 7/1218 | 474/117 |
| 5,370,586 A * | 12/1994 | Thomsen | F16H 7/1281 | 267/155 |
| 5,443,424 A * | 8/1995 | Henderson | F16H 7/1218 | 474/135 |
| 5,462,494 A * | 10/1995 | Rogalla | F16H 7/1218 | 474/135 |
| 5,545,095 A * | 8/1996 | Henderson | F16H 7/1218 | 474/135 |
| 5,558,587 A * | 9/1996 | Church | F16H 7/0848 | 474/112 |
| 5,647,812 A * | 7/1997 | McDonald | F16H 7/08 | 474/111 |
| 5,662,540 A * | 9/1997 | Schnuepke | F01L 1/02 | 474/111 |
| 6,231,465 B1 * | 5/2001 | Quintus | F16H 7/1218 | 474/101 |
| 6,428,435 B1 * | 8/2002 | Kumakura | F16H 7/08 | 474/111 |
| 6,835,149 B2 * | 12/2004 | Konno | F16H 7/08 | 474/111 |
| 8,083,623 B2 * | 12/2011 | Cantatore | F16H 7/08 | 474/109 |
| 8,092,327 B2 * | 1/2012 | Kobara | F02B 67/06 | 474/101 |
| 8,337,344 B2 * | 12/2012 | Meano | F16H 7/1218 | 474/109 |
| 8,353,795 B2 * | 1/2013 | Montani | F16H 7/1281 | 474/118 |
| 2003/0109342 A1 * | 6/2003 | Oliver | F16H 7/1281 | 474/134 |
| 2003/0144101 A1 * | 7/2003 | Konno | F16H 7/08 | 474/111 |
| 2003/0153422 A1 * | 8/2003 | Quintus | F02B 67/06 | 474/135 |
| 2003/0216203 A1 * | 11/2003 | Oliver | F16H 7/1281 | 474/134 |
| 2003/0216205 A1 * | 11/2003 | Meckstroth | F16H 7/1227 | 474/135 |
| 2004/0097311 A1 * | 5/2004 | Smith | F16H 7/1281 | 474/135 |
| 2005/0261094 A1 * | 11/2005 | Foster | F16H 7/1236 | 474/113 |
| 2005/0288137 A1 * | 12/2005 | Vargas | F16H 55/54 | 474/47 |
| 2006/0058136 A1 * | 3/2006 | Mosser | F16H 7/1281 | 474/135 |
| 2009/0105022 A1 * | 4/2009 | Cantatore | F16H 7/08 | 474/111 |
| 2010/0222169 A1 * | 9/2010 | Meano | F16H 7/1218 | 474/135 |
| 2010/0234155 A1 * | 9/2010 | Antchak | F16H 7/1218 | 474/135 |
| 2010/0261564 A1 * | 10/2010 | Hughes | F16H 7/1281 | 474/135 |
| 2011/0207568 A1 * | 8/2011 | Smith | F16H 7/1281 | 474/135 |
| 2011/0230286 A1 * | 9/2011 | Cohen | B62M 9/08 | 474/49 |
| 2012/0040790 A1 * | 2/2012 | Perissinotto | F16H 7/0836 | 474/110 |
| 2013/0324337 A1 * | 12/2013 | Yoshida | F16H 7/08 | 474/110 |
| 2014/0315673 A1 * | 10/2014 | Zacker | F16H 7/1218 | 474/135 |

* cited by examiner (a)     (b)

LOAD APPLICATION DEVICE

BACKGROUND

The present invention relates to a load-applying device that includes a tensioner used to keep constant the tension of a belt or chain.

The tensioner, as one type of load-applying device, presses, for example, a timing chain or timing belt that is used in a car engine, with a predetermined force, and if the timing chain or timing belt elongates or slackens, the tensioner acts to keep the tension constant.

FIG. 31 shows the inside of an engine main body 200 of a car. Inside the engine main body 200 are arranged (1) a pair of cam sprockets 210, 210 that are driven shafts, and (2) a crank sprocket 220 that is a driving shaft. A timing chain 230 is stretched over the sprockets 210, 220 in an endless manner. The rotation of the crank sprocket 220 causes the timing chain 230 to move (travel) around the outer peripheries of the sprockets 210, 210, 220. A chain guide 240 is disposed along the moving route of the timing chain 230 so as to contact the timing chain 230, so that the timing chain 230 moves while sliding on the chain guide 240. The chain guide 240 is able to oscillate on a support shaft 250 so as to adjust the tension of the timing chain 230.

The reference sign 300 designates a tensioner that is provided inside the engine main body 200 and that is configured to press the chain guide 240 towards the timing chain 230. The tensioner 300 that is generally used has a configuration such that the tensioner expands and contracts in its axial direction to press the chain guide 240. This tensioner 300 includes a case 310 that is fixed to the inside of the engine main body 200, and a propulsion shaft 320 that is arranged inside the case 310 so as to be movable forward and backward. The propulsion shaft 320 is biased by a coil spring (not shown) that is arranged in the case 310 in such a manner as to move out from the case 310. The propulsion shaft 320 presses the chain guide 240 at distal end of the propulsion shaft 320 so as to provide tension to the timing chain 230.

The tensioner 300 shown in FIG. 31 is configured such that the coil spring and the propulsion shaft 320 are arranged inside the case 310, and such that the propulsion shaft 320 moves axially in both directions. As a result, the tensioner 300 becomes longer in the axial direction, limiting the extent to which the length of the tensioner 300 can be shortened in the axial direction, and therefore the tensioner 300 has a problem that it is not easily applied in a small engine. Accordingly, in order to overcome such a problem, a tensioner using a spiral spring has been developed. (See Patent Documents 1 and 2.)

The tensioner of Patent Document 1 includes a cam member made of an eccentric cam that oscillates a chain guide in the timing-chain-tension direction, and a spiral spring that biases the cam member to move in the direction to press the chain guide. A backstop claw engages with the cam member, which prevents the reverse movement of the cam member. The spiral spring has a configuration such that the inner end thereof is locked to the fixing pin of the engine main body, and the outer end thereof is locked to the cam member, so that the spiral spring, by the expansion of its diameter, biases the cam member to move and to press the chain guide.

The tensioner of Patent Document 2 also uses a spiral spring and a cam member, the cam member including a cam surface that is curved involutely. Also, a chain guide is coupled to a rolling bearing that rollably contacts the cam member's surface. Thus, the movement of the cam member causes the rolling bearing to roll on the surface of the cam. The spiral spring is configured such that the outer end thereof is locked to the engine main body, and the inner end thereof is locked to the cam member, so that the spiral spring biases the cam member to rotate, whereby the cam member is moved so as to press the chain guide.

The tensioners that are described in Patent Documents 1 and 2, respectively, are configured such that a cam member coupled to a spiral spring contacts a chain guide to provide tension to a timing chain by causing it to oscillate, which eliminates the reciprocal axial movement of the tensioner, which allows the axial length of the tensioner to be shortened.

PRIOR-ART DOCUMENTS

Patent Document

[Patent Document 1] Japanese Patent No. 4149570
[Patent Document 2] Japanese Unexamined Patent Application Publication No. 2011-140972

SUMMARY

However, the tensioners described in Patent Documents 1 and 2 include such problems as: (1) the high rigidity of the cam member lessens the damping force for decreasing the vibration from the timing chain, and produces a striking sound; and (2) due to the need for a member that prevents a cam member from reverse rotation and for a coupling member that connects the cam member to a spiral spring, the number of required parts for the tensioner is needlessly large and the configuration of the tensioner is needlessly complicated.

To overcome such problems, the present invention provides a load-applying device, such as a tensioner, that has high vibration-damping power, the ability to minimize the generation of striking sounds, and a simple configuration.

A load-applying device according to the invention includes (1) a spiral spring that is formed from a thin strip that is wound multiple times in a spiral shape, (2) a movable body, and (3) a fixing member, with said spiral spring disposed between said movable body and said fixing member, in a manner capable of performing a diameter reduction operation and a diameter expansion operation, and an outer-circumference part of said spiral spring contacting said movable body and said fixing member directly, or indirectly.

The invention further includes an inner-end part of said spiral spring is a winding part for winding the spiral spring, and said winding part is movable inside said spiral shape in response to winding of the spiral spring, and diameter expansion and diameter reduction of the spiral spring.

The invention further includes the outer circumference part of said spiral spring indirectly contacts said movable body via an indirect member.

The invention of the load-applying device, wherein the outer circumference part of said spiral spring indirectly contacts said fixing member via a plate-like elastic member.

The invention of the load-applying device, wherein expansion of the diameter of said spiral spring causes the outer-circumference part of said spiral spring to contact said fixing member, said movable body, said indirect member or said plate-like elastic member, respectively, at at least two positions each.

The invention of the load-applying device, wherein a receiving part having a triangular shape, a circular shape, or a linear shape is formed at said fixing member's part, said indirect member's part or said plate-like elastic member part, which is opposite to the outer-circumference part of said spiral spring.

The invention of the load-applying device, wherein a damping member is disposed between (1) the outer-circumference part of said spiral spring, and (2) either said indirect member and/or said fixing member.

The invention of the load-applying device, wherein a plurality of said spiral springs are arranged between said fixing member and said indirect member in the direction from which loads are received from said movable body, and an intermediate member is also disposed between said spiral springs that are adjacent to each other.

The invention of the load-applying device, wherein said plate-like elastic member contacts said fixing member or said indirect member at both ends of said plate-like elastic member in the longitudinal direction of said plate-like elastic member, and the intermediary part of said plate-like elastic member in the longitudinal direction thereof is opposite to said fixing member or said indirect member in such a manner that a space is formed between (1) the intermediary part of said plate-like elastic member in the longitudinal direction thereof, and (2) said fixing member or said indirect member, the space being deformable due to deflection of said plate-like elastic member.

The invention of the load-applying device, wherein each of said multiple spiral springs comprises a thin strip that extends between said spiral springs.

The invention of the load-applying device, wherein said fixing member or said intermediate member is split in a direction that crosses the direction in which a load is received from said movable body, so as to form multiple split bodies, with each of said split bodies being reciprocally movable in the direction to contact said indirect member in accordance with the expansion and reduction of the diameter of said spiral spring.

The invention of the load-applying device, wherein an adjusting mechanism is disposed in the longitudinal direction of the load-applying device between said fixing member and said movable body.

The invention of the load-applying device, further including a temporary fixing means that maintains said spiral spring in a wound state.

The invention of the load-applying device, wherein said movable body is a timing chain or a timing belt that moves in an endless manner inside a car engine.

The invention of the load-applying device, wherein said movable body is a rocker arm that swingably moves to open and close an air-intake valve of a car engine.

Advantageous Effects of the Invention

The present invention provides a configuration in which the outer-circumference part of a spiral spring contacts a movable body either directly or indirectly via an indirect member, so as to press the movable body, which results in the reduction of the number of parts needed to be used, allowing the configuration to be simple. Also the rigidity of the device is reduced, the damping force to reduce vibration is increased, and the production of striking sounds is prevented.

BRIEF DESCRIPTION OF THE DRAWINGS

FIG. 9 shows a cylindrical body for winding that is used for the modified form of the tensioner, and wherein FIG. 9(a) is a side view and FIG. 9(b) is a front view.

FIG. 10 shows a tensioner as a load-applying device according to the Second Embodiment of the present invention, and wherein FIG. 10(a) is a side view of the state in which a spiral spring has been wound, and FIG. 10(b) is a front view of that state.

FIG. 12 shows the first case part used for the tensioner according to the Second Embodiment, and wherein FIG. 12(a) is a side view, FIG. 12(b) is a front view, and FIG. 12(c) is a sectional view taken along line b-b of FIG. 12(a).

FIG. 13 shows the second case part used for the tensioner according to the Second Embodiment, and wherein FIG. 13(a) is a side view, FIG. 13(b) is a front view, and FIG. 13(c) is a sectional view taken along line c-c of FIG. 13(a).

FIG. 14 shows a propulsion member, and wherein FIG. 14(a) is a side view and FIG. 14(b) is a front view.

FIG. 17 shows a damping member used for the tensioner according to the Third Embodiment, and wherein FIG. 17(a) is a rear view and FIG. 17(b) is a side view.

FIG. 18 shows a tensioner as a load-applying device according to the Fourth Embodiment of the present invention, and wherein FIG. 18(a) is a sectional view taken along line d-d of FIG. 18(b), and FIG. 18(b) is a front view.

FIG. 24 shows a tensioner as a load-applying device according to the Eighth Embodiment of the present invention, and wherein FIG. 24(a) is a side view and FIG. 24(b) is a front view.

FIG. 27 shows a tensioner as a load-applying device according to the Ninth Embodiment of the present invention, and wherein FIG. 27(a) is a sectional view taken along line j-j of FIG. 27(b), and FIG. 27(b) is a front view.

DETAILED DESCRIPTION

The present invention will be specifically explained below in terms of embodiments thereof, with reference to the attached drawings. Members that are the same in the respective embodiments have the same reference signs.

(First Embodiment)

FIGS. 1-7 show how the First Embodiment of the tensioner 10 is used as one of the load-applying devices of the present invention.

Figure 1:
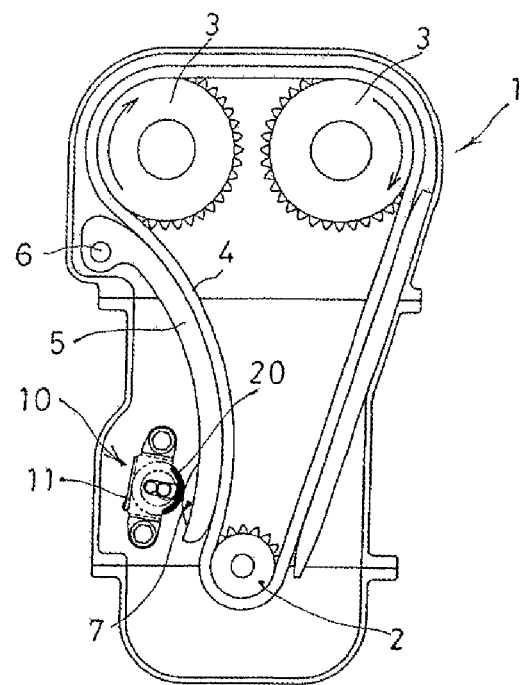
FIG. 1 is a sectional view that shows an engine main body that incorporates a tensioner as a load-applying device according to the First Embodiment of the present invention.

FIG. 1 shows an engine main body 1 that is provided with a tensioner 10. The engine main body 1 also includes a crank sprocket 2 that acts as a driving shaft, two cam sprockets 3 that act as driven shafts, and a timing chain 4 as a movable body that is stretched in an endless manner over the sprockets 2, 3. The timing chain 4 moves (travels) over the sprockets 2, 3, due to the rotation of the crank sprocket 2. A chain guide 5 is disposed as a guide member along the moving route of the timing chain 4, so as to contact the timing chain 4, so that the timing chain 4 moves while sliding on the chain guide 5. The chain guide 5 is oscillatable on a support shaft 6, and the tension of the timing chain 4 is adjusted by this oscillation.

The tensioner 10, which is provided inside the engine main body 1 so as to be opposite to the chain guide 5, applies tension to the timing chain 4 by pressing and oscillating the chain guide 5. In this embodiment, the tensioner 10 includes a spiral spring 20, as is explained later. When the outer-circumference part of the spiral spring 20 contacts the chain guide 5, the spring force of the spiral spring 20 is indirectly communicated to the timing chain 4 as a movable body via the chain guide 5. Accordingly, the chain guide 5 as a guide member constitutes a member through which the outer-circumference part of the spiral spring 20 indirectly contacts the timing chain (movable body) 4, which rotates the cam sprocket 3 (cam shaft) so that the timing chain 4 receives varying torque and moves with varying tension. As a result, the tensioner 10 receives vibration (alternate loads) from the timing chain 4 and the chain guide 5.

Figure 2:
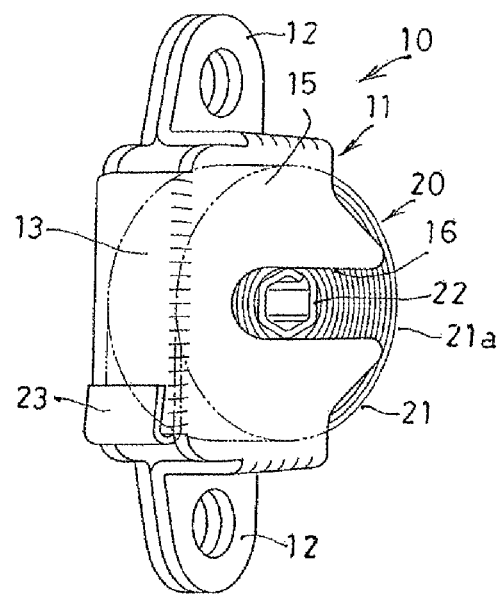
FIG. 2 is a perspective view that shows the tensioner according to the First Embodiment of the present invention.
Figure 3:
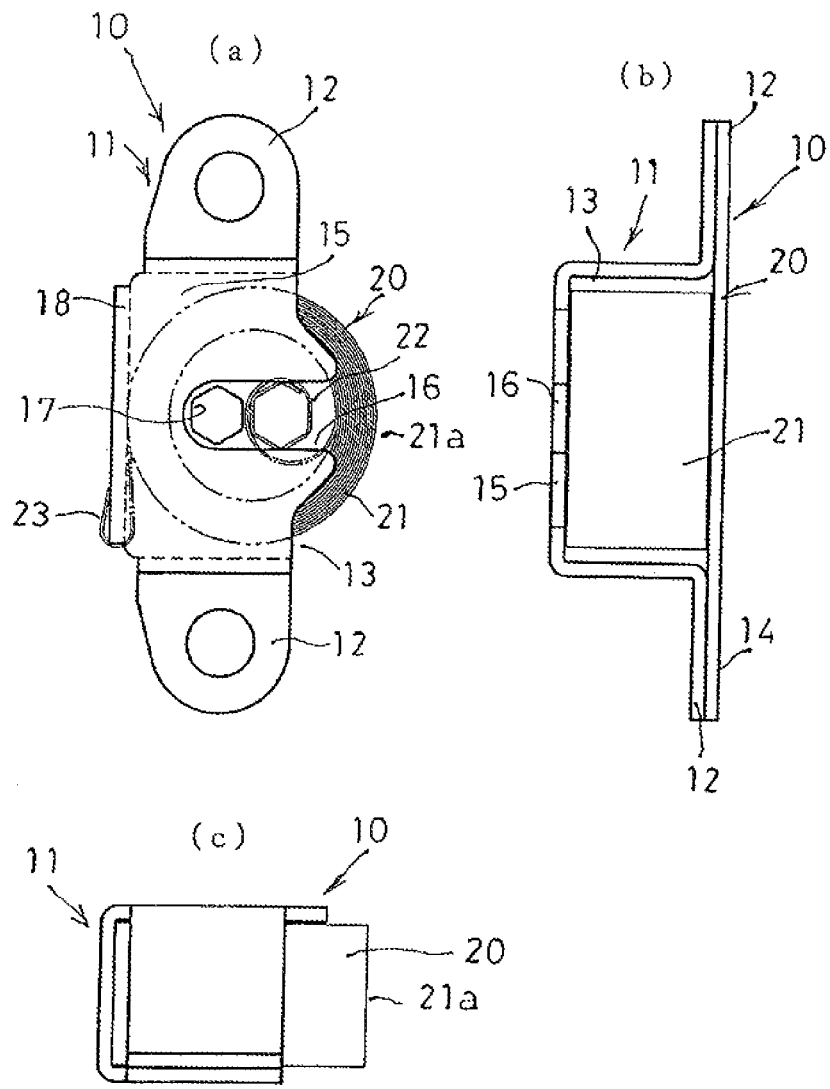
FIG. 3(a) is a side view.
FIG. 3(b) is a front view.
FIG. 3(c) is a bottom view of the tensioner according to the First Embodiment.

FIGS. 2 and 3 show the tensioner 10 according to this embodiment, wherein the spiral spring 20 is housed in a case 11, which is a fixing member that houses the spring.

The case 11 as a fixing member includes a housing member 13 that includes a bottom plate part 14 and a top plate part 15, and in which the spiral spring 20 is housed. The case 11 includes a flange part 12 that extends in the vertical direction of the case, and the tensioner 10 is mounted to the flange part 12 by using a fastener such as a bolt so as to fix the tensioner 10 inside the engine main body 1.

The spiral spring 20 is formed by winding into a spiral shape a thin strip that has spring properties and is housed in the housing member 13. Under the condition in which the spiral spring 20 is housed in the case 11, the spiral spring 20 is sandwiched in the plate-width direction by the bottom plate part 14 and the top plate part 15 at both ends of the thin strip. This allows the spiral spring 20 to be housed in the case 11 in such a way that the thin strip cannot be dislocated (cannot move freely) in the plate-width direction. Also, the case 11 is provided with a spring-receiving part (receiving part) 18 that is contacted by the outer-circumference part 21 of the spiral spring 20. (See FIGS. 3, 4, and 6.) In this embodiment, the spring-receiving part 18 has a planar (linear) shape, wherein the outer-circumference part 21 contacts the linear spring-receiving part (receiving part) 18, so that the spiral spring 20 is supported by the case 11.

Under the condition in which the spiral spring 20 is housed in the case 11, the spiral spring 20 partially exposes the outer-circumference part 21 from the case 11. The reference sign 21a designates the exposed part of the outer-circumference part 21 of the spiral spring 20, and this exposed part 21a directly contacts the receiving part 7 of the chain guide 5. (See FIG. 6.) Because the exposed part 21a directly contacts the receiving part 7, the spiral spring 20 is capable of directly applying a biasing force to the chain guide 5 so as to oscillate the chain guide 5. Also, the vibration from the chain guide 5 is directly applied to the spiral spring 20.

The spiral spring 20 includes a winding part 22, which is the inner end of the spring 20, that is formed in a hexagonal shape, and includes an outer-end locking part 23, which is hooked on the case 11 so as to be locked. The winding part 22 is exposed by a cutout part 16 that is formed at the top plate part 15 of the case 11, and a winding member 30, such as a hexagonal wrench, can be inserted into the winding part 22 through the cutout part 16. (See FIGS. 4 and 5.) Thus, it is possible to wind (reduce the diameter of) the spiral spring 20 by operating the winding member 30. A hexagonal temporary tacking hole 17 is formed at the bottom plate part 14 of the case 11, and after the distal end of the winding member 30 has been inserted into the hole 17, the distal end of the winding member 30 is locked by and into the temporary tacking hole 17. Locking the distal end of the winding member 30 into the temporary tacking hole 17 restricts the rotation of the winding member 30. Thus, the spiral spring 20 can be temporarily fixed in the wound state (diameter-reduced state). This temporary tacking hole 17 constitutes a temporary fixing means that maintains the spiral spring 20 in a wound state. Also, the winding part 22 of the spiral spring 20 and the temporary tacking hole 17 of the case 11 are formed into a noncircular shape that is suited to the external shape of the winding member 30. If the external shape of the winding member 30 has a triangular cross-section or a square cross-section, the temporary tacking hole 17 is formed into noncircular shape suited to the specific cross-section.

Figure 4:
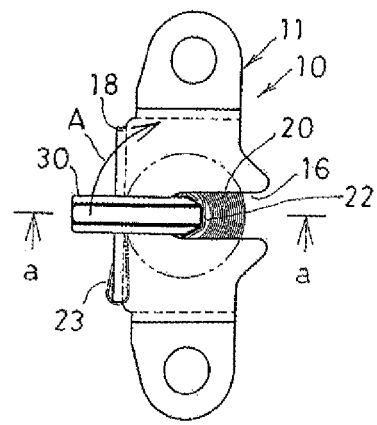
FIG. 4 is a side view that shows the state in which a spiral spring is being wound.
Figure 5:
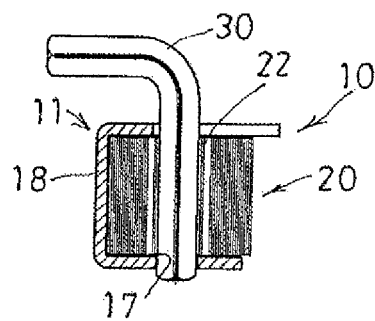
FIG. 5 is a sectional view taken along line a-a of FIG. 4 after the spiral spring has been wound.

Next, the operation of the tensioner 10 according to this embodiment will be explained. In the state before the tensioner 10 is fixed on the engine main body 1, the winding member 30 is inserted into the winding part 22 of the spiral spring 20 and is rotated in the winding direction A, as is shown in FIG. 4. This causes the spiral spring 20 to be wound so as to reduce its diameter, whereby the spring 20 stores a spring force. After the diameter of the spiral spring 20 has been reduced, the distal end of the winding member 30 is locked in the temporary tacking hole 17 of the case 11, as is shown in FIG. 5. This causes the wound state of the spiral spring 20 in the tensioner 10 to be temporarily fixed. After that, the tensioner 10 is mounted to the engine main body 1. This causes the exposed part 21a of the outer-circumference part 21 of the spiral spring 20 to be opposite to the receiving part 7 of the chain guide 5.

After the tensioner 10 has been mounted to the engine main body 1, the winding member 30 is removed. This causes the diameter of the spiral spring 20 to expand due to the stored spring force, which allows the outer-circumference part 21 of the spiral spring 20 to contact the spring-receiving part 18 of the case 11 and the receiving part 7 of the chain guide 5. This causes the spiral spring 20 to receive a load from the timing chain 4 and to receive a load (support force) from the case 11. Because the outer-circumference part 21 of the spiral spring 20 is received by the spring-receiving part 18, the expansion of the diameter of the spiral spring 20 causes the exposed part 21a of the outer-circumference part 21 of the spiral spring 20 to press the chain guide 5 so as to oscillate the chain guide 5. Accordingly, the tensioner 10 is capable of applying tension to the timing chain 4 via the chain guide 5.

Figure 6:
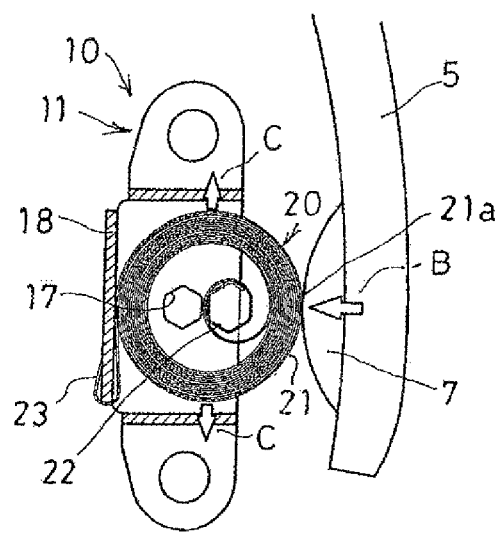
FIG. 6 is a side view that illustrates the operation of the tensioner according to the First Embodiment.

FIG. 6 shows the state in which the spiral spring 20 receives a load from the chain guide 5 by contacting the chain guide 5. The spiral spring 20 is sandwiched between the receiving part 7 of the chain guide 5 and the spring-receiving part (receiving part) 18 of the case 11, so that the spiral spring 20 receives from the chain guide 5 the alternate loading (vibration) applied by the chain guide 5, as shown by the arrow B. This alternate loading causes the spiral spring 20 to expand in the arrow-C directions, and causes the exposed part 21a to deflect in the arrow-Direction B. Because the spiral spring 20 is a member made by winding in a spiral shape multiple times a thin strip that has spring properties, the layered structure of the thin strip allows the spiral spring 20 to be able to withstand strong alternate loading.

Figure 7:
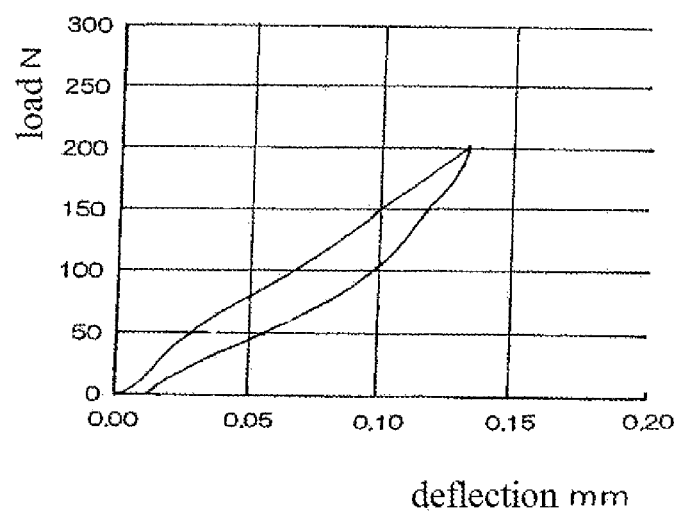
FIG. 7 is a deflection-load curve of the spiral spring.

FIG. 7 shows a deflection-load curve of the spiral spring 20 when static loads are applied on the outer-circumference part 21 of the spiral spring 20. The spiral spring 20 is a member made by spirally winding a thin strip multiple times, so that applying a load on the spiral spring 20 causes friction between the layers formed by winding the thin strip. The tensioner 10 that has received from the chain guide 5 alternate loads (vibration) in the arrow-Direction B is pressed in the arrow-Direction B and exerts a large force. However, if the diameter of the spiral spring 20 expands in the direction opposite to the Direction B, the tensioner 10 exerts a small force. Because of this difference in the forces that the tensioner 10 exercises (hysteresis), a large difference is generated between the arrow-Direction B and the direction opposite to the arrow-Direction B. This hysteresis allows the tensioner 10 to absorb the alternate loads (vibration) received from the chain guide 5, so that the damping force for reducing such vibration can be increased. If the tensioner is constituted by an elastic member such as a compression coil spring having small hysteresis instead of being constituted by a spiral spring, the difference in the force generated in the Direction B and the direction opposite thereto is quite small, and therefore it is difficult for the tensioner to absorb the alternate loads (vibration) received from the chain guide 5. Also, because the spiral spring 20 is formed by winding a thin strip multiple times, the spring 20 has less rigidity than a solid member would have, which restricts the generation of striking sounds and hence reduces noise.

However, if the timing chain 4 is elongated and the chain guide 5 moves in the direction opposite to arrow-direction B, the spiral spring 20 follows the movement of the chain guide 5 so that the diameter of the spiral spring 20 continuously expands in response to the movement of the chain guide 5. This expansion of the diameter of the spiral spring 20 causes the outer-circumference part 21 to press the chain guide 5, so that the tension of the timing chain 4 can continuously be adjusted. In this case, because the spiral spring 20 is formed by a thin strip, the friction generated between the layers of the spiral spring 20 increases as the diameter of the spiral spring 20 expands, which causes the load to be reduced. Also, the speed at which that diameter expands becomes slow, whereby it is possible to reduce excessive momentary tension of the timing chain 4. This causes the chain guide 5 to be pressed gently, which prevents the tension of the timing chain 4 from increasing more than is necessary. If the timing chain 4 is tensed, as is shown by FIG. 6, the spiral spring 20 is deflected to prevent excessive tension of the timing chain 4.

In addition, because the spiral spring 20 is made by winding a thin strip, the tensioner 10 can be small, whereby the space required for installing the tensioner 10 is reduced. Also, using the spiral spring 20 reduces the number of parts needed to assemble the tensioner 10, which in turn makes the configuration of the tensioner 10 simple.

Figure 8:
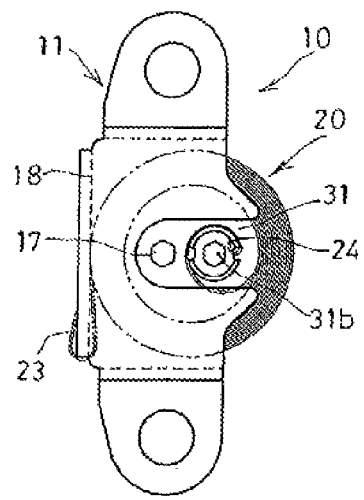
FIG. 8 is a side view that shows a modified form of the tensioner according to the First Embodiment.
Figure 9:
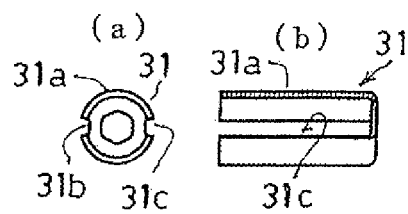

FIG. 8 shows the tensioner 10 according to a modified form of this embodiment. In the tensioner 10 of this form, a cylindrical body for winding 31 is provided to the inner end of the spiral spring 20, instead of the hexagonal winding part 22 being formed at the inner end of the spiral spring 20. As is shown in FIG. 9, the cylindrical body for winding 31 includes a cylindrical body main body 31a that is formed so as to have approximately the same width as the width of the plate of the thin strip of the spiral spring 20, a hexagonal hole for winding 31b that is formed in the center of the cylindrical body's main body 31a, and a locking recessed part 31c that is formed in the longitudinal direction along the outside of the cylindrical body's main body 31a.

The cylindrical body for winding 31 is inserted into the inner end of the spiral spring 20, and the inner-end locking part 24 of the spiral spring 20 is locked to the locking recessed part 31c, so that the cylindrical body for winding 31 is coupled to the spiral spring 20. Then, a winding member 30, such as a hexagonal wrench, is inserted into the hole for winding 31b of the cylindrical body for winding 31 and is rotated. This allows the spiral spring 20 to store spring force as the spiral spring 20 is wound. After the spiral spring 20 has been wound, the spiral spring 20 can be temporarily tacked in the state in which the spring force is stored by locking the distal end of the winding member 30 in the temporary tacking hole 17 of the case 11. Providing the cylindrical body for winding 31, which is a separate member from the spiral spring 20, eliminates the need of machining the inner end of the spiral spring 20, whereby manufacturing the spiral spring 20 is made easier.

(Second Embodiment)

Figure 10:
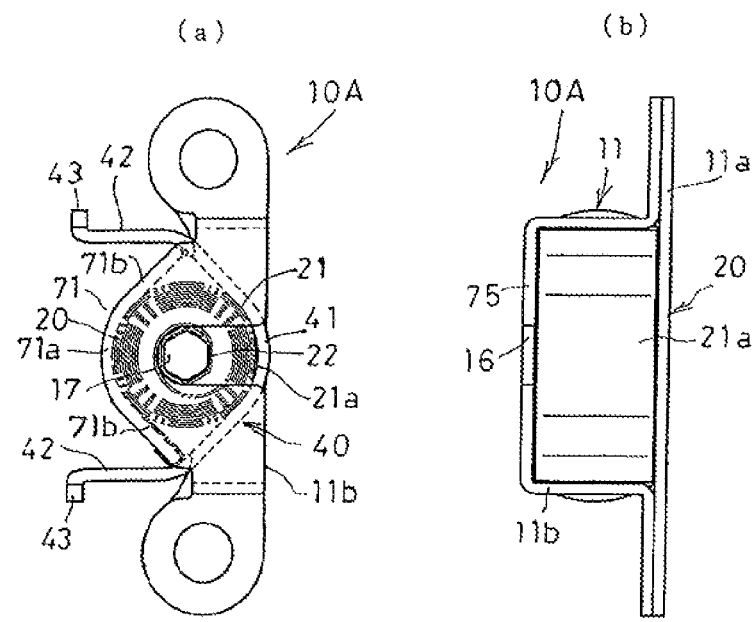
Figure 11:
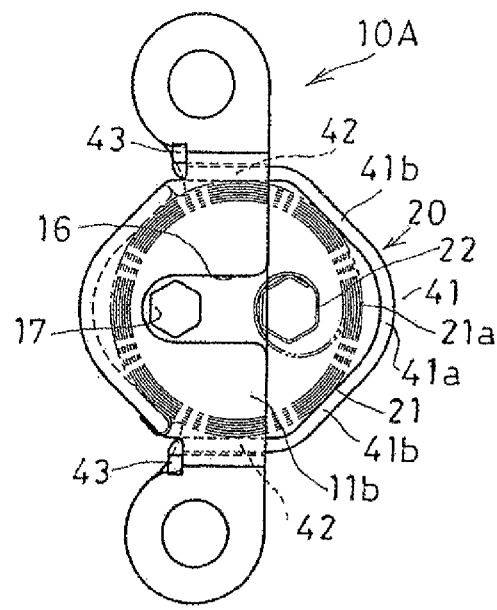
FIG. 11 is a side view that shows a diameter-expanded state of the spiral spring of the tensioner according to the Second Embodiment.

FIGS. 10-15 show the tensioner 10A being used as a load-applying device according to the Second Embodiment of the present invention. The tensioner 10A further includes a propulsion member 40 in addition to the case 11 and the spiral spring 20 of the tensioner 10 of the First Embodiment 1. As is shown in FIGS. 10 and 11, the propulsion member 40 covers the exposed part 21a of the outer-circumference part 21 of the spiral spring 20 in the circumferential direction and reciprocally moves relative to the case 11 in accordance with the expansion and reduction of the diameter of the spiral spring 20. In this embodiment, the propulsion member 40 covers the outer-circumference part 21 of the spiral spring 20; the propulsion member 40 is disposed between the outer-circumference part 21 of the spiral spring 20 and the chain guide 5. Accordingly, the propulsion member 40 constitutes a member through which the outer-circumference part 21 of the spiral spring 20 indirectly contacts the timing chain (movable body) 4.

Figure 14:
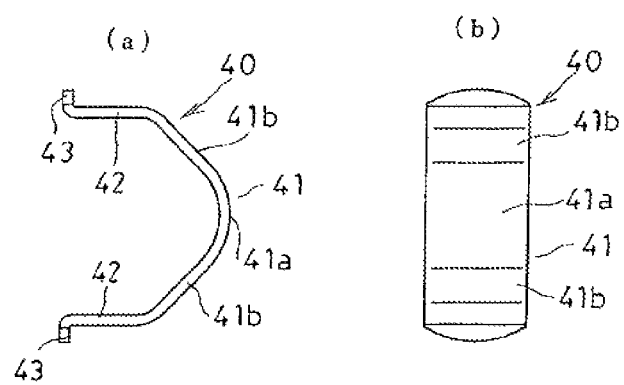

FIG. 14 shows the propulsion member 40, which is formed by a strip having about the same width as the width of the thin strip of the spiral spring 20. This propulsion member 40 includes a covering part 41 that covers the exposed part 21a in the outer-circumference part 21 of the spiral spring 20, guide parts 42 that extend linearly from both ends of the covering part 41 in a direction away from the chain guide 5, and stopper parts 43 that are formed at the ends of the guide parts 42.

The covering part 41 has at its center a circular part 41a, with a sloping straight part 41b extending from each side of the circular part 41a. The two sloping straight parts 41b extend obliquely from their respective sides of the circular part 41a in different directions. The covering part 41, which consists of the circular part 41a and the sloping straight parts 41b, contacts the outer-circumference part 21 of the spiral spring 20 from the diameter-reducing state to the diameter-expanding state of the spiral spring 20. That is, in the diameter-reducing state of the spiral spring 20, the exposed part 21a in the outer-circumference part 21 of the spiral spring 20 contacts the circular part 41a of the covering part 41 (see FIG. 10), and in the diameter-expansion state of the spiral spring 20, the outer-circumference part 21 of the spiral spring 20 contacts the sloping straight part 41b of the covering part 41 (see FIG. 11). This covering part 41, being opposite to the outer-circumference part 21 of the spiral spring 20, constitutes a receiving part that receives the outer-circumference part 21 of the spring 20. The circular part 41a of the covering part 41, forming a circular shape, receives the outer-circumference part 21 of the spiral spring 20, and the sloping straight parts 41b that extend, respectively, from each side of the circular part 41a and form a triangular shape, receive the outer-circumference part 21 of the spiral spring 20.

The guide parts 42 of the propulsion member 40 slide on the case 11 when the propulsion member 40 moves, which causes the propulsion member 40 to stably move forward and backward. The stopper part 43 locks to the case 11 due to the forward movement of the propulsion member 40, which restricts the forward movement of the propulsion member 40 within a predetermined range, and prevents the propulsion member 40 from coming off the case 11.

Figure 12:
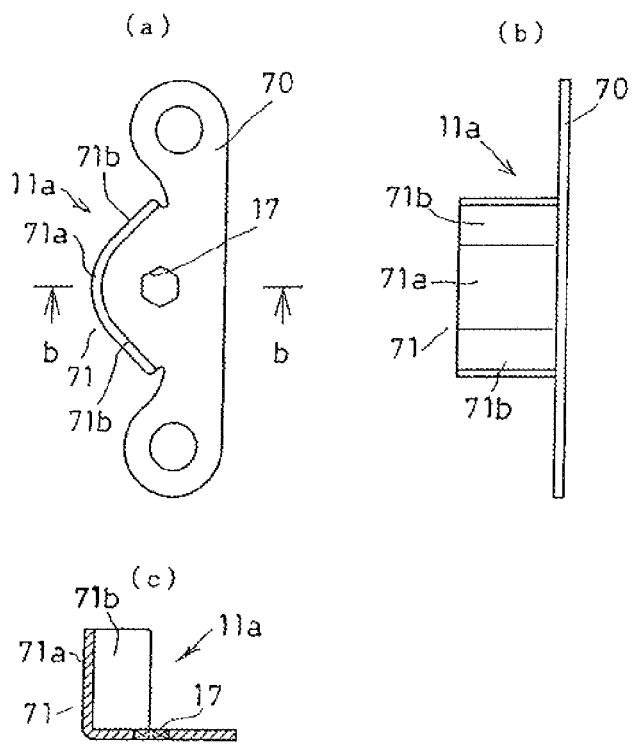
Figure 13:
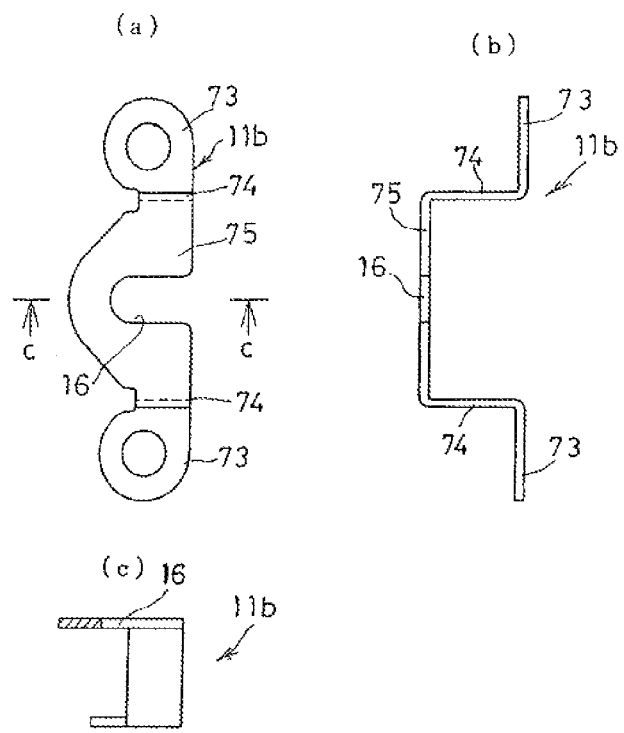

The first case part 11a, which forms a part of the case 11, which is a fixing member, is shown in FIG. 12, and the second case part 11b, which also forms a part of said case 11, is shown in FIG. 13.

As is shown in FIG. 12, the first case part 11a includes a flat flange part 70 and a spring-receiving part (receiving part) 71 that is integrally raised in the longitudinal direction from the approximately central part of the flange part 70. The flange part 70 is the part to be assembled with the second case part 11b, which includes a temporary tacking hole 17 to which the winding member 30 is locked.

The spring-receiving part (receiving part) 71 rises from the flange part 70 so as to correspond to the outer-circumference part 21 of the spiral spring 20. The height of the spring-receiving part 71 is almost the same as the width of the thin strip of the spiral spring 20. The spring-receiving part 71 has a circular part 71a at its center, and a sloping straight part 71b extends, respectively, from each side of the circular part 71a. Providing the circular part 71a between the sloping straight parts 71b causes the spiral spring 20 to occupy the space between the circular part 71a and the circular part 41a of the covering part 41 in the propulsion member 40 in the smallest diameter state after the spiral spring 20 has been wound, which prevents a space from being made between the spiral spring 20 and the spring-receiving part 71, and prevents a space from being made between the spiral spring 20 and the propulsion member 40. This eliminates the need for the spring-receiving part 71 to be needlessly long. The two sloping straight parts 71b respectively extend obliquely from each side of the circular part 71a in different directions. This spring-receiving part 71 contacts the outer-circumference part 21 of the spiral spring 20 from the diameter-reducing state to the diameter-expanding state of the spiral spring 20, wherein in the diameter-reducing state of the spiral spring 20, the exposed part 21a in the outer-circumference part 21 of the spiral spring 20 contacts the circular part 71a (see FIG. 10), and in the diameter-expanding state of the spiral spring 20, the outer-circumference part 21 of the spiral spring 20 contacts the sloping straight parts 71b (see FIG. 11). This circular part 71a of the receiving part 71, which like the circular part 41a of the covering part 41, receives the outer-circumference part 21 of the spiral spring 20, and the two sloping straight parts 71, which respectively are on the sides of the circular part 71a and together form a triangular shape, receive the outer-circumference part 21 of the spiral spring 20.

As is shown in FIG. 13, the second case part 11b includes flat-shaped flange parts 73 on both sides in the longitudinal direction, rising parts 74 that rise up from the respective flange parts 73 to approximately the same height as the width of the thin strip of the spiral spring 20, and a top plate part 75. The top plate part 75 covers the upper side of the spiral spring 20, and is provided with a cutout part 16 through which a winding member 30 is inserted. The guide parts 42 of the propulsion member 40 slide on the rising part 74, which causes the propulsion member 40 to reciprocally move stably.

In the tensioner 10A according to this embodiment, the spiral spring 20 is arranged in the space enclosed by the spring-receiving part 71 of the case 11 and the propulsion member 40. In this state, the winding member 30 is inserted into the winding part 22 of the spiral spring 20 and is rotated in the winding direction, which causes the spiral spring 20 to be wound and its diameter to be reduced. This allows the spiral spring 20 to store spring force. FIG. 10 shows the state in which the spiral spring 20 has been wound, wherein the outer-circumference part 21 of the spiral spring 20 contacts both the circular part 71a of the spring-receiving part 71 of the case 11 and the circular part 41a of the covering part 41 of the propulsion member 40 (see FIG. 15(a)). The triangular marks in FIGS. 15(a)-(d) designate the contact parts 27 where the propulsion member 40 contacts the outer-circumference part 21 of the spiral spring 20.

If the winding member 30 is removed from the winding part 22 to release the spiral spring 20, the diameter of the spiral spring 20 expands due to the spring force that the spiral spring 20 has stored. This expansion of the diameter of the spiral spring 20 causes the outer-circumference part 21 of the spiral spring 20 to contact the spring-receiving part 71 of the case 11 at two points, and to contact the propulsion member 40 at two points, as is indicated by the contact parts 27. That is, as is shown in FIG. 15(b), the outer-circumference part 21 of the spiral spring 20 contacts the respective sloping straight parts 71b of the spring-receiving part 71 and the respective sloping straight parts 41b of the covering part 41 of the propulsion member 40. Because the outer-circumference part 21 of the spiral spring 20 is pressed at four points, if the spiral spring 20 receives alternate loads from the chain guide 5 in this state of contact, the rigidity in the axial direction of the spiral spring 20 becomes larger than that of the tensioner 1 of the First Embodiment, which has only two contact points, in the present embodiment reducing the deflection in the axial direction, so that the tensioner according to the present embodiment is capable of receiving larger alternate loads.

Figure 15:
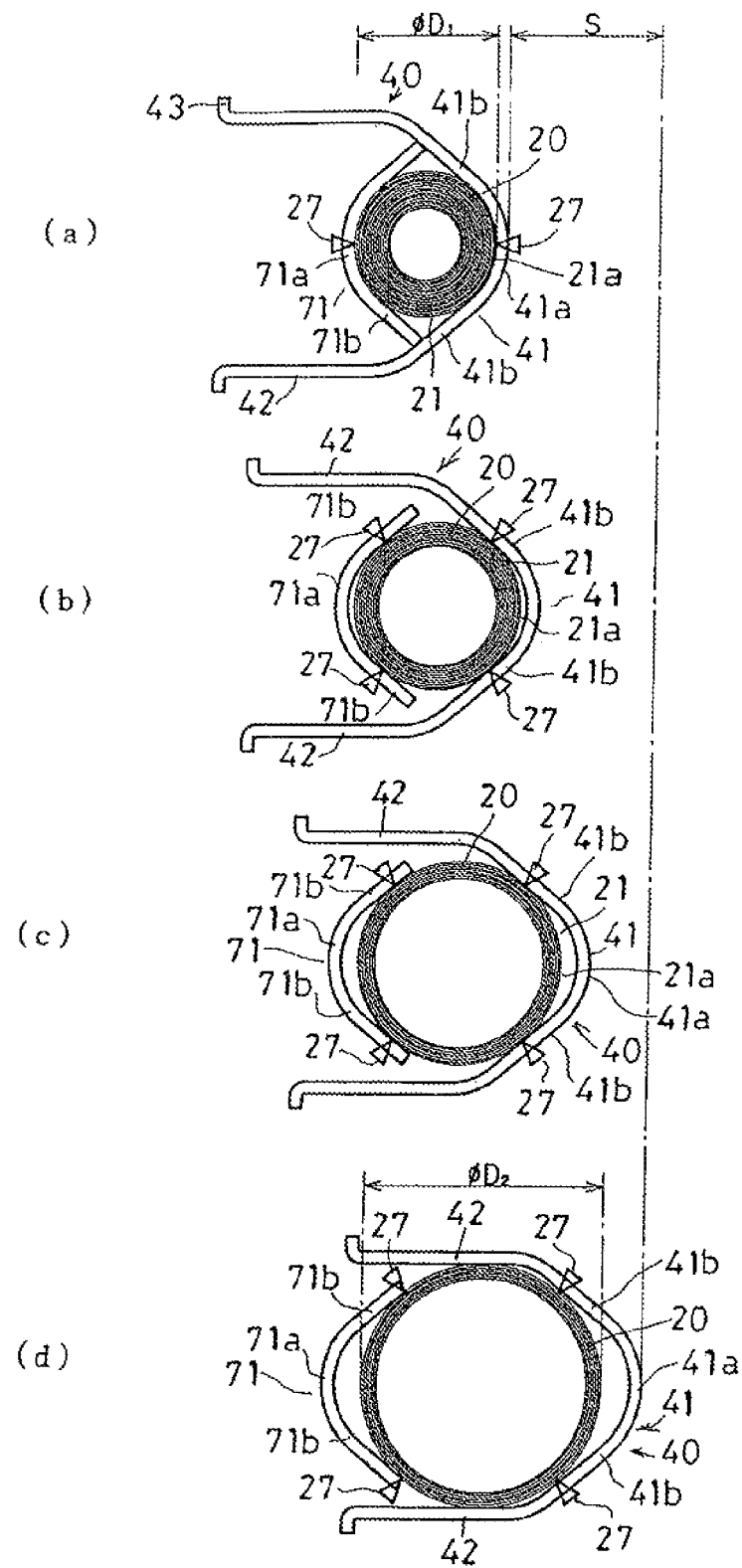
FIG. 15(a)-FIG. 15(d) show side views that illustrate the operation of the tensioner of the Second Embodiment.

FIG. 15 shows the operations of the tensioner 10A according to this embodiment. As is explained above, if the diameter of the spiral spring 20 expands, the outer-circumference part 21 of the spiral spring 20 contacts the two sloping straight parts 71b of the spring-receiving part 71 at two points, forming a triangular shape, and contacts the two sloping straight parts 41b of the covering part 41 of the propulsion member 40 at two points, also forming a triangular shape, so that the propulsion member 40 moves forward while maintaining this contact state. As the diameter of the spiral spring 20 increases, as is sequentially shown in FIGS. 15(b), 15(c), and 15(d), the contact parts 27 move relative to the spring-receiving part 71 and the propulsion member 40, and the covering part 41 of the propulsion member 40 moves away from the outer-circumference part 21 of the spiral spring 20. This causes the propulsion member 40 to move forward more than the diameter of the spiral spring 20 expands, whereby the tensioner according to this embodiment can function over a larger space.

In the Second Embodiment, as is shown in FIG. 11 and FIGS. 15(b)-15(d), the outer-circumference part 21 (which is the circular part of the spiral spring 20), the propulsion member 40, and the spring-receiving part 71 are arranged in a series. In a configuration like this, if the tensioner receives, from the engine, vibration (load from the timing chain [movable body] 4) in the propulsion member 40 and the spring-receiving part 71, the sloping straight parts 41b and 71b are enlarged while sliding on the outer-circumference part 21 of the spiral spring 20, and the spiral spring 20 deflects in the retracting direction (direction B) of the propulsion member 40. In contrast, if the vibration (the load from the timing chain [movable body] 4) from the engine lessens, the sloping straight parts 41b and 71b slide on the spiral spring 20 (the outer-circumference part 21 of the spiral spring) so that the space between the sloping straight parts 41b and 71b and the spiral spring 20 becomes narrower, and move in the propulsion direction (the direction opposite to direction B) of the propulsion member 40. This corresponds to the case where loads are applied or removed on a disc spring placed on an annular member, which generates large friction in the propulsion direction (the difference of a load caused by sliding (hysteresis)). These configurations involve the second hysteresis exercised by the propulsion member 40 and the spring-receiving part 71 in addition to the hysteresis exercised only by the spiral spring 20 in the First Embodiment, whereby these configurations result in larger damping characteristics than in the case of the First Embodiment.

That is, if the outer diameter of the spiral spring 20 when its diameter is the smallest of the diameters in FIG. 15 is denoted by $\varphi D1$, and if the outer diameter of the spiral spring 20 in its released and expanded state is denoted by $\varphi D2$, the amount of forward movement S of the propulsion member 40 becomes larger than $\varphi D2 - \varphi D1$ ($S > \varphi D2 - \varphi D1$). For example, if $\varphi D1$ is assumed to be a diameter of 12 mm, and $\varphi D2$ is assumed to be a diameter of 20 mm, S would be approximately 12 mm. Because $\varphi D2 - \varphi D1 = 8$ mm, the tensioner according to this Embodiment can operate over a distance that is about 1.5 times larger than the maximum distance to which the diameter of the spiral spring 20 can be expanded.

In addition, in the propulsion member 40 and the spring-receiving part 71 of the case 11 according to present invention, it is sufficient that the circular parts 41a, 71a are opposite to the outer-circumference part 21 of the spiral spring 20, and that there be formed sloping straight parts 41b, 71b that extend from those circular parts. That is, it is not necessary that the propulsion member 40 and the spring-receiving part 70 be formed to have the same shapes as the shapes shown in FIG. 10 or FIG. 11, and it is sufficient that the circular parts 41a, 71a be formed only on the part of the propulsion member 40 and the spring-receiving part 71, respectively, that are opposite to the outer-circumference part 21 of the spiral spring 20 (the opposing face), and that the sloping straight parts 41b, 71b be formed so as to extend from the circular parts. Also, the propulsion member 40 and the spring-receiving part 71 can be configured so as to contact the outer-circumference part 21 of the spiral spring 20 at more than three points. Moreover, the covering part 41 of the propulsion member 40 and the spring-receiving part 71 can be configured so as to have only a circular shape, or to have only two sloping straight parts that obliquely cross to form a triangular shape. Further, the shape of the circular part 41a is intended to shorten the length of the propulsion member 40, and therefore the shape of this part is not limited to a circular one, but can be freely modified and adapted to be a linear, pointed, or protruding shape, according to the shape of the opposing member (receiving part 7).

(Third Embodiment)

Figure 16:
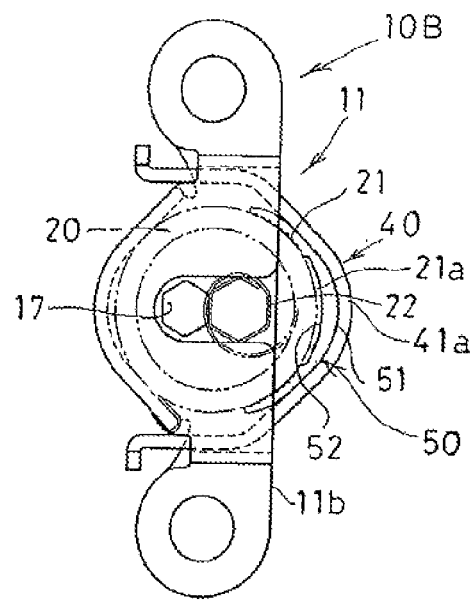
FIG. 16 is a side view that shows a tensioner as a load-applying device according to the Third Embodiment of the present invention.
Figure 17:
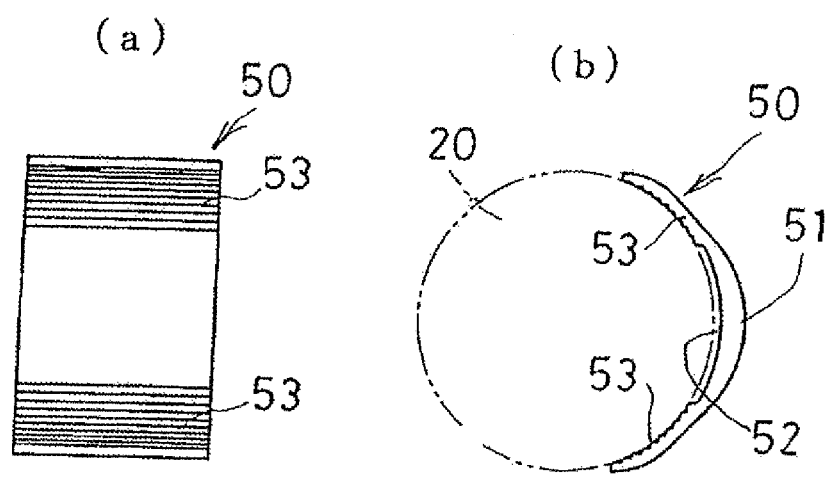

FIGS. 16 and 17 show the tensioner 10B used as a load-applying device according to the Third Embodiment of the present invention. The tensioner 10B according to this embodiment is configured such that a damping member 50 is incorporated in the tensioner 10A as in the Second Embodiment.

As is shown in FIG. 16, the damping member 50 is disposed so as to be sandwiched between the propulsion member 40 and the exposed part 21a in the outer-circumference part 21 of the spiral spring 20. The opposing face 51 of the damping member 50 that is to be opposite to the propulsion member 40 is formed so as to match the configurations of the circular part 41a and the sloping straight parts 41b in the covering part 41 of the propulsion member 40. In contrast, the opposing face 52 of the damping member 50 that is to be opposite to the spiral spring 20 is formed in a circular shape so as to match the outer-circumference part 21 of the spiral spring 20. The opposing face 52 that is opposite to the spiral spring 20 is provided with projecting and retracting parts 53.

As is shown in FIG. 17, the projecting and retracting parts 53 are to be formed in the width direction on both sides of the damping member 50. These projecting and retracting parts 53 contact the outer-circumference part 21 of the spiral spring 20. Providing the projecting and retracting parts 53 to the opposing face 52 of the damping member 50 that is disposed between the propulsion member 40 and the outer-circumference part 21 of the spiral spring 20 with the opposing face 52 being opposite to the spiral spring 20 as in this embodiment causes the loads from the chain guide 5 to be dispersed when applied to the spiral spring 20. Accordingly, the loads applied to the spiral spring 20 can be evened, which results in preventing uneven abrasions of the spiral spring 20. The damping member 50 can be made of a metal such as a steel sheet, but a damping member 50 made of a resin can further reduce the wearing away of the surface of the spiral spring 20 due to abrasion. Also, providing the projecting and retracting parts 53 to the damping member 50 is not required for configuring this embodiment.

Furthermore, in the tensioner 10B according to this embodiment, the damping member 50 is disposed as between the propulsion member 40, which is an indirect member, and the outer-circumference part 21 of the spiral spring 20. However, the damping member 50 can be disposed between the outer-circumference part 21 of the spiral spring 20 and the case 11 as a fixing member, and also can be disposed both between the outer-circumference part 21 of the spiral spring 20 and the propulsion member 40, and between the outer-circumference part 21 of the spiral spring 20 and the case 11.

(Fourth Embodiment)

Figure 18:
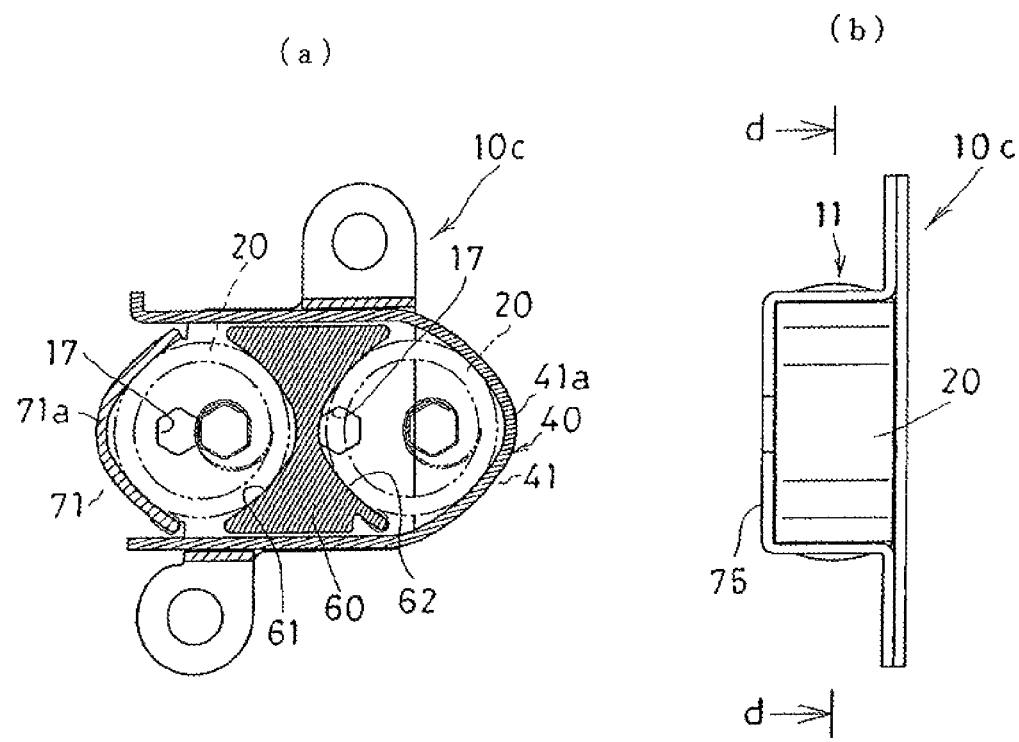

FIG. 18 shows the tensioner 10C used as a load-applying device according to the Fourth Embodiment of the present invention. The tensioner 10C is provided with two spiral springs 20 arranged side by side, between which an intermediate member 60 is disposed. The two spiral springs 20 are arranged side by side in the direction to receive loads from the chain guide 5, on which the timing chain 4 (movable body) slides.

The propulsion member 40 according to this embodiment has the same shape as the propulsion member 40 of the Second Embodiment, and is provided so as to cover the outer-circumference part 21 of the right-side spiral spring 20 that faces the chain guide 5 so as to press the chain guide 5. The intermediate member 60, which is disposed between the two side-by-side spiral springs 20, moves toward the chain guide 5 due to the expansion of the diameter of the left-side spiral spring 20, so as to push forward the right-side spiral spring 20 toward the chain guide 5 (to the right). This causes the right-side spiral spring 20 to be pressed forward in the same direction, so that the expansion of the diameter of the right-side spiral spring 20 presses the propulsion member 40 toward the chain guide 5. Accordingly, the propulsion member 40 operates with the amount of forward movement generated by the combined expansion of the diameters of the two left-and-right spiral springs 20, whereby the propulsion member 40 can function over a larger space.

In this embodiment, the intermediate member 60 is configured such that the left and right opposing faces 61, 62 that are opposite to the two spiral springs 20 have circular forms, so that the intermediate member 60 contacts the left and right outer-circumference parts 21 of the spiral springs 20 over a large area. This causes the expansion of the left-side spiral spring 20 to be securely transferred to the right-side spiral spring 20. Also, the load that is applied to the right-side spiral spring 20 from the chain guide 5 is dispersed by the left and right opposing faces 61, 62 of the intermediate member 60, so that the received load is damped.

Moreover, in this embodiment, both the spring-receiving part 71 of the case 11 that receives the outer-circumference part 21 of the left-side spiral spring 20 and the covering part 41 of the propulsion member 40 corresponding to the outer-circumference part 21 of the right-side spiral spring 20 have circular shapes, so that the contact areas between the intermediate member 60 and the outer-circumference parts 21 of the spiral spring 20 are made large.

In this Embodiment, three or more spiral springs 20 can be arranged in parallel in the direction of the load that is received from the chain guide 5, and intermediate members 60 can be disposed between the respective adjacent spiral springs 20. This increases the amount of forward movement of the propulsion member 40 in accordance with the increase in the number of spiral springs 20 arranged in parallel. Also, the degree to which the above-mentioned received load can be damped can be increased in accordance with an increase of the number of spiral springs 20 and the number of intermediate members 60.

(Fifth Embodiment)

Figure 19:
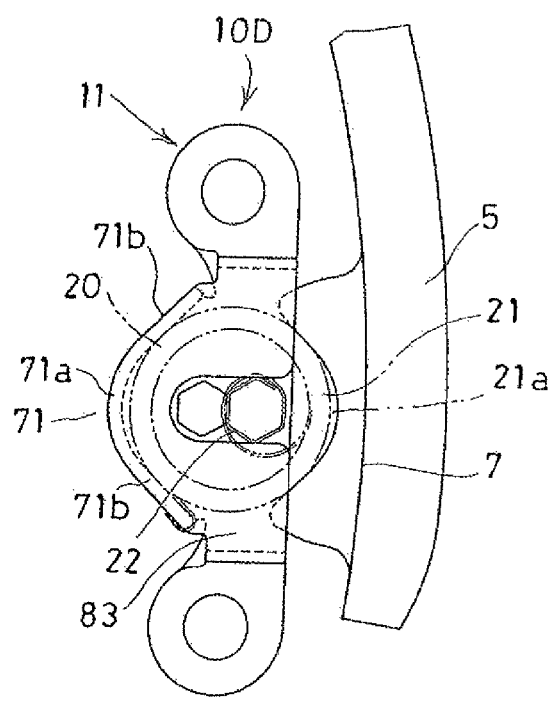
FIG. 19 is a side view that shows a tensioner as a load-applying device according to the Fifth Embodiment of the present invention.

FIG. 19 shows the tensioner 10D used as a load-applying device according to the Fifth Embodiment of the present invention. In the tensioner 10D, the receiving part 7 of the chain guide 5 that is opposite to the exposed part 21a of the outer-circumference part 21 of the spiral spring 20 and that contacts the outer-circumference part 21 has a recessed shape. This embodiment includes a spring-receiving part 71 that extends from the engine main body 1, and the outer-circumference part 21 of the spiral spring 20 contacts this spring-receiving part 71. The spiral spring 20 is disposed so as to be sandwiched between this spring-receiving part 71 and the receiving part 7 of the chain guide 5, and is fixed to the engine main body 1 by a cover 83 that covers the spiral spring 20. The spring-receiving part 71 of the engine main body 1 functions as a fixing member to fix the spiral spring 20 to the engine main body 1.

(Sixth Embodiment)

Figure 20:
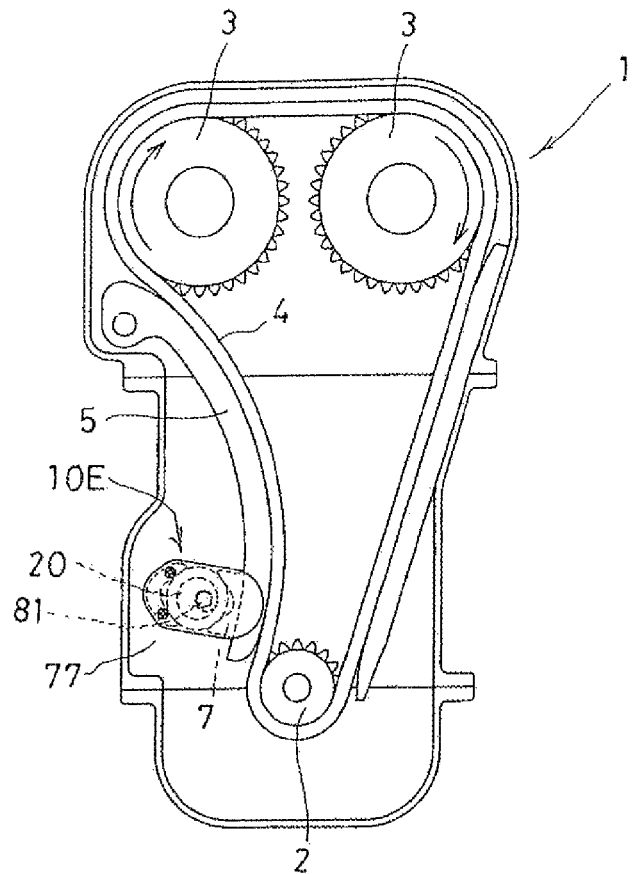
FIG. 20 is a sectional view that shows a state in which a tensioner as a load-applying device according to the Sixth Embodiment of the present invention has been mounted to an engine main body.
Figure 21:
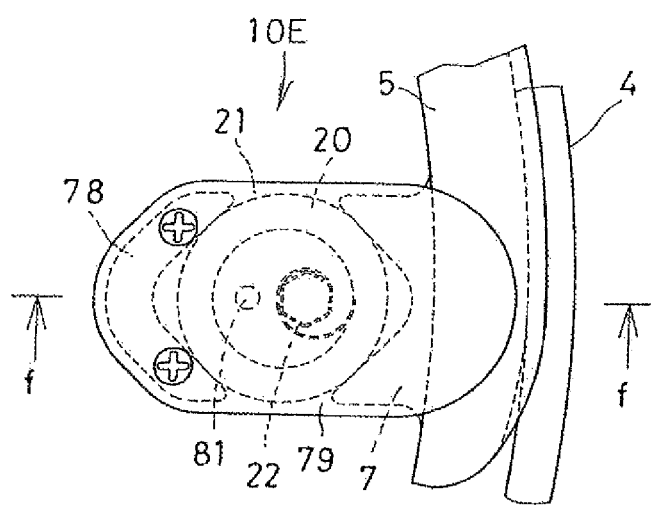
FIG. 21 is a front view that shows the tensioner according to the Sixth Embodiment.
Figure 22:
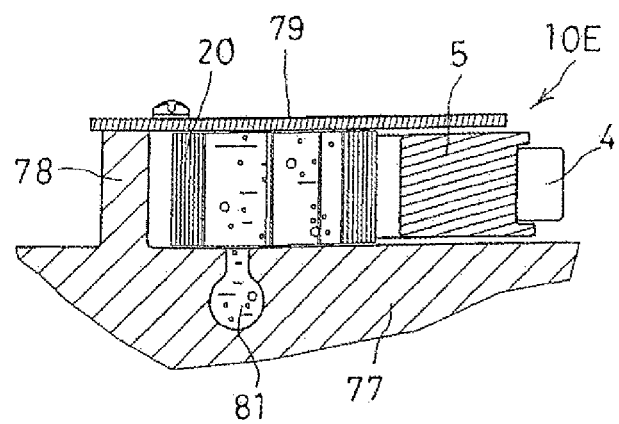
FIG. 22 is a sectional view taken along line f-f of FIG. 21.

FIGS. 20-22 show the tensioner 10E used as a load-applying device according to the Sixth Embodiment of the present invention. As shown in FIG. 20, the tensioner 10E is fixed to the inside of the engine main body 1. The engine main body 1 is used as a fixing member, so that the tensioner 10E is configured by the spiral spring 20 being fixed to the engine main body 1. That is, as is shown in FIGS. 21 and 22, a circular-shaped receiving block 78, which is a receiving part to receive the spiral spring 20, integrally projects from the engine block 77 of the engine main body 1, the outer-circumference part 21 of the spiral spring 20 is made to contact this receiving block 78, and the holding cover 79 is made to cover the spiral spring 20 and be screwed thereto, whereby the spiral spring 20 is fixed to the engine main body 1. Thus, the spiral spring 20 operates being sandwiched between the receiving block 78 (engine main body 1) and the recess-shaped receiving part 7 of the chain guide 5.

The inner peripheral part of the spiral spring 20 is hollow so that hydraulic pressure from the engine main body 1 can be supplied to this inner peripheral part. That is, an oil passage 81 that is connected to the hydraulic pump of the engine is formed on the engine block 77, and this oil passage 81 opens to the inner peripheral part of the spiral spring 20. This causes hydraulic pressure to be transferred from the engine main body 1 into the spiral spring 20. The timing chain 4 is pressed by the tensioner 10E when hydraulic pressure is added to the spring force of the spiral spring 20. That is, if the vibration received from the timing chain 4 (chain guide 5) becomes excessive due to an increase of the rotation speed of the engine, the spring force applied only by the spiral spring 20 might not be sufficient to securely press the timing chain 4. However, this embodiment is configured such that hydraulic pressure is added to augment the spring force of the spiral spring 20. Therefore, even if the timing chain 4 vibrates strongly, the vibration of the timing chain 4 can be restrained. Also, even when hydraulic pressure is applied, because the spiral spring 20 is deformed and deflected, the pressure applied to the timing chain 4 is reduced as appropriate.

(Seventh Embodiment)

Figure 23:
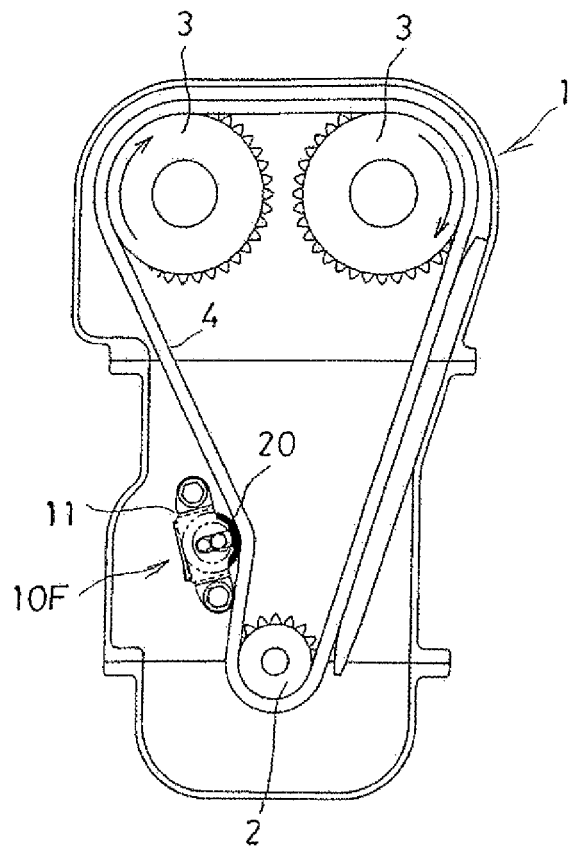
FIG. 23 is a sectional view that shows a state in which a tensioner as a load-applying device according to the Seventh Embodiment of the present invention has been mounted to an engine main body.

FIG. 23 shows the tensioner 10F used as a load-applying device according to the Seventh Embodiment of the present invention. The tensioner 10F is arranged inside the engine main body 1, but the engine main body 1 is not provided with a chain guide 5 as an indirect member. The outer-circumference part 21 of the spiral spring 20 that is fixed to the case 11 directly contacts the timing chain 4 as a movable body to directly press the timing chain 4. The tension of the timing chain 4 can be adjusted through such direct contact.

(Eighth Embodiment)

Figure 24:
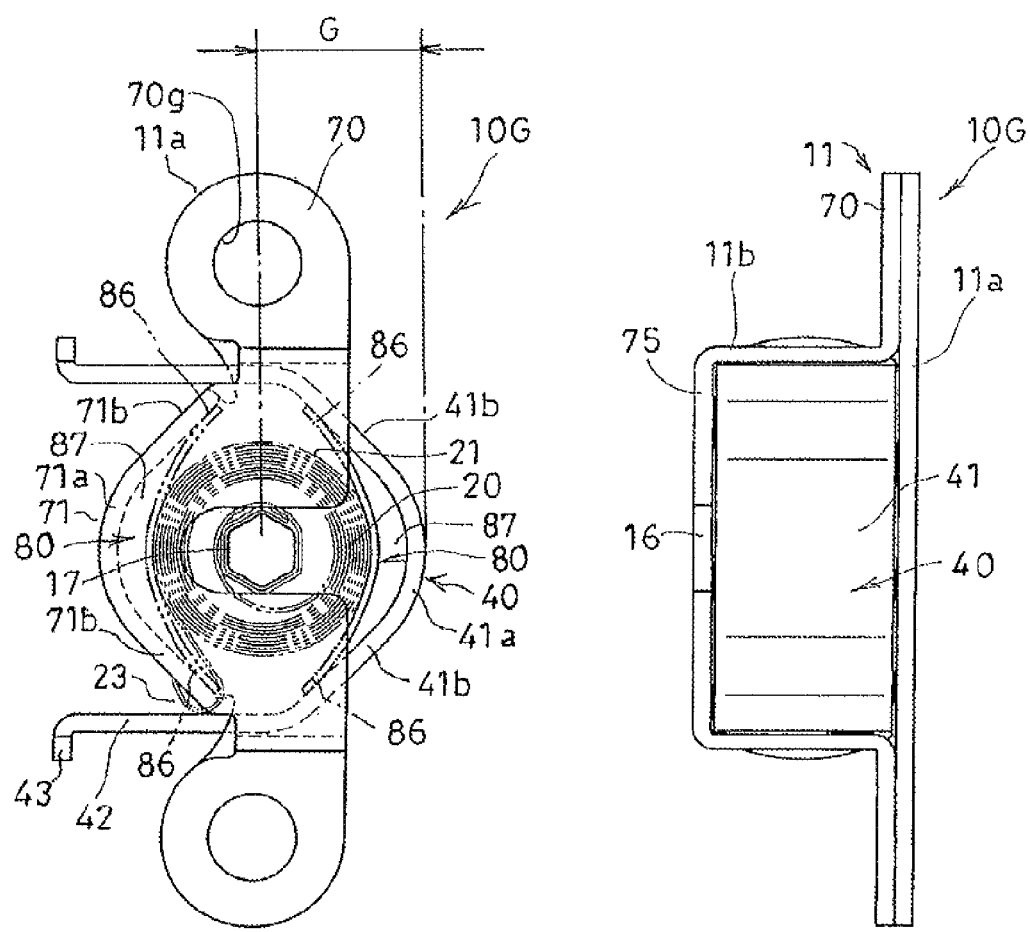
Figure 25:
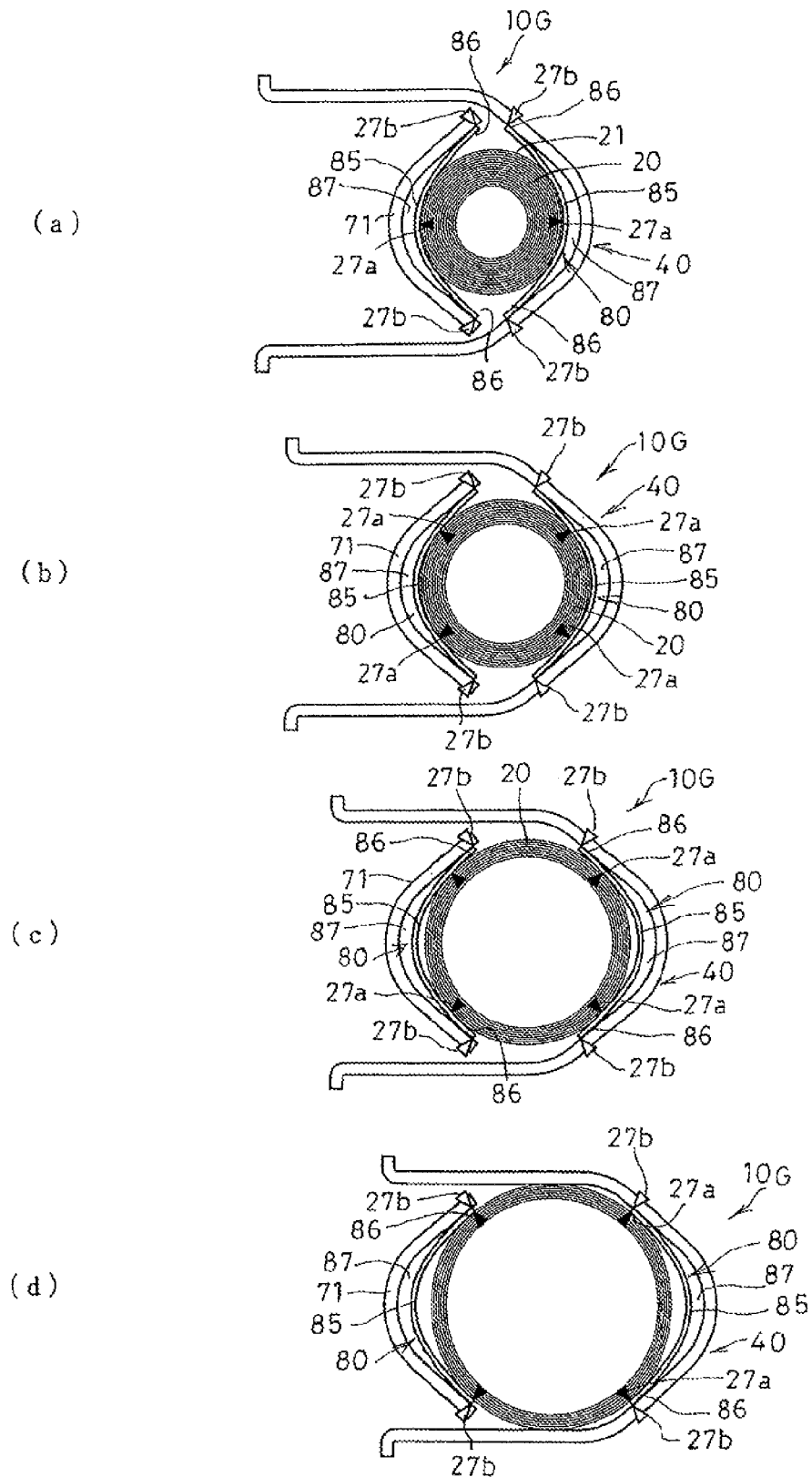
FIG. 25(a)-FIG. 25(d) show side views that illustrate the operation of the tensioner according to the Eighth Embodiment.
Figure 26:
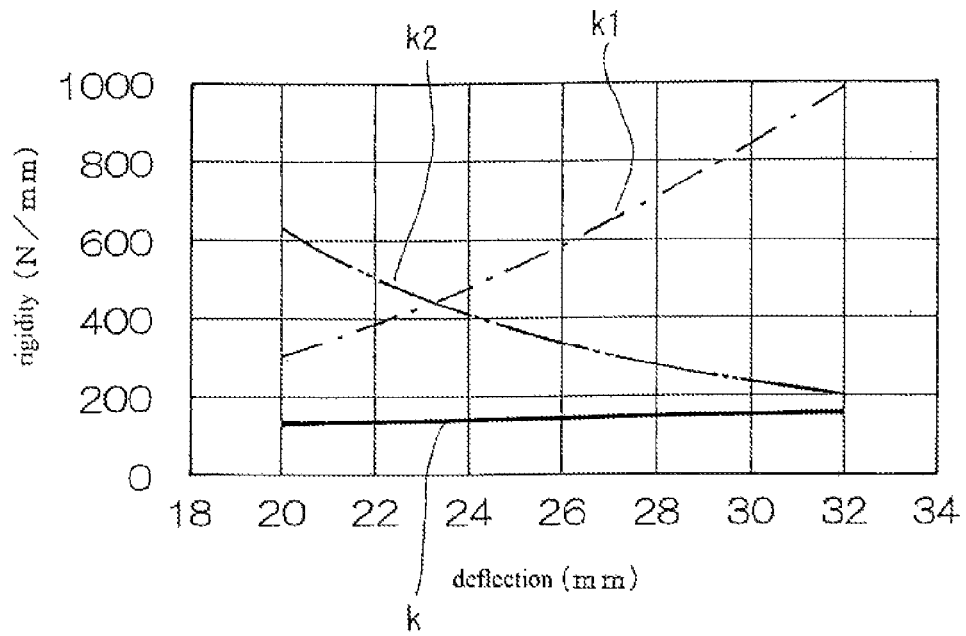
FIG. 26 is a graph that shows the static rigidity-deflection amounts of the tensioner according to the Eighth Embodiment.

FIGS. 24-26 show the tensioner 10G used as a load-applying device according to the Eighth Embodiment of the present invention. The tensioner 10G is provided with a plate-like elastic member 80 in addition to the propulsion member 40.

The propulsion member 40 according to this embodiment is formed so as to have the same shape as the propulsion member 40 of the Second Embodiment, and is provided so as to cover the outer-circumference part 21 of the right-side spiral spring 20 and to receive loads from the chain guide 5. The propulsion member 40 is formed by a circular-shaped covering part 41 that covers the outer-circumference part 21 of the spiral spring 20, guide parts 42 that extend linearly from each of the two ends of the covering part 41 away from the chain guide 5, and stopper parts 43 at the ends of the guide parts 42. The covering part 41 has a circular part 41a and two sloping straight parts 41b that extend from their respective sides of the circular part 41a.

The case 11 as a fixing member that houses the spiral spring 20 according to this Embodiment is configured to be the same as the case of the Second Embodiment, and is formed by being assembled with the first case part 11a and the second case part 11b. The first case part 11a includes a spring-receiving part 71 that is raised from a flange part 70. The spring-receiving part 71 includes a circular part 71a and two sloping straight parts 71b that extend from their respective sides of the circular part 71a.

Two plate-like elastic members 80 are respectively disposed between the spiral spring 20 and the propulsion member 40, and between the spiral spring 20 and the spring-receiving part 71 of the case 11, whereby they are mounted to the tensioner 10G. A plate spring is used for the plate-like elastic member 80.

The two plate-like elastic members 80 are respectively disposed between the spiral spring 20 and the propulsion member 40, and between the spiral spring 20 and the spring-receiving part 71. The plate-like elastic member 80 that faces the propulsion member 40 is opposite to the circular part 41a, wherein the intermediary part 85 located at the middle in the longitudinal direction orthogonal to the plate-width of the spiral spring 20 creates a deflection-deformable space 87 along with the circular part 41a of the covering part 41 in the propulsion member 40. Also, the plate-like elastic member 80 that faces the spring-receiving part 71 is opposite to the circular part 71a, wherein the intermediary part 85 located at the middle in the longitudinal direction orthogonal to the plate-width of the spiral spring 20 creates a deflection-deformable space 87 along with the circular part 71a of the spring-receiving part 71.

If a load from the timing chain (movable body) 4 is applied to the plate-like elastic member 80, the two ends 86 of the plate-like elastic member 80 that faces the propulsion member 40 in the longitudinal direction contact the sloping straight parts 41b of the propulsion member 40, and the two ends 86 of the plate-like elastic member 80 that faces the spring-receiving part 71 in the longitudinal direction contact the sloping straight parts 71b of the spring-receiving part 71, so as to receive the load (hereinafter when referring to this embodiment, "axial-direction load") from the chain guide 5.

FIGS. 25(a)-25(d) show the changes of the contact points between the plate-like elastic member 80 and the spiral spring 20, between the plate-like elastic member 80 and the propulsion member 40, and between the spiral spring 20 and the spring-receiving part 71, in accordance with the expansion and reduction of the diameter of the spiral spring 20. In FIG. 25, black triangular marks indicate the contact parts 27a where the outer-circumference part 21 of the spiral spring 20 contacts the plate-like elastic member 80, and white triangular marks indicate the contact parts 27b where the two ends 86 of the plate-like elastic member 80 contact the propulsion member 40 and the spring-receiving part 71, respectively.

FIG. 25(a) shows the state when the diameter of the spiral spring 20 is the smallest, wherein the contact parts 27a of the outer-circumference part 21 of the spiral spring 20 respectively contact the intermediary parts 85 of the two plate-like elastic members 80. Also, the contact parts 27b at which the propulsion member 40 and the spring-receiving part 71 contact the plate-like elastic member 80 are the two ends 86 of the plate-like elastic member 80. In this state, because the distance between the contact part 27a and the contact part 27b is long, the deflection of the plate-like elastic member 80 is large, and the rigidity (k2) of the plate-like elastic member 80 is low. In contrast, the rigidity (k1) of the single spiral spring 20 is high because the number of turns of the spiral spring 20 is large and the outer diameter of the spiral spring 20 is small.

FIGS. 25(b)-25(d) show the state when the diameter of the spiral spring 20 is expanding. In accordance with the expansion of the diameter of the spiral spring 20, the contact parts 27a where the outer-circumference part 21 of the spiral spring 20 contacts the plate-like elastic member 80 move in the longitudinal direction of the plate-like elastic member 80, so that the distance between the contact part 27a and the contact part 27b gradually reduces. In FIG. 25(d), the contact parts 27a, where the outer-circumference part 21 of the spiral spring 20 contacts the plate-like elastic member 80, respectively move to the two ends 86 of the plate-like elastic members 80, so that the distance between the contact part 27a and the contact part 27b is reduced, and the rigidity (k2) of the plate-like elastic member 80 increases. In contrast, the rigidity (k1) of the single spiral spring 20 decreases because the number of turns of the spiral spring 20 is reduced, and the outer diameter of the spiral spring 20 increases. Thus, the rigidity of the tensioner 10G resulting from combining the rigidity of the spiral spring 20 and the rigidity of the plate-like elastic members 80 changes in accordance with the change of the diameter size of the spiral spring 20.

FIG. 26 is a graph that shows the relationship between the protruding-margin dimension G (see FIG. 24) of the propulsion member 40 and the entire range of rigidity (static load and amount of displacement of the distal ends of the propulsion member 40) based on the operation of the tensioner 10G. The explanation in this paragraph is made by treating the propulsion member 40 and the spring-receiving part 71 as a single rigid body. The horizontal axis in FIG. 26 indicates the distance between the center of the tensioner mounting hole 70g on the flange part 70 of the case 11 and the distal end of the propulsion member 40, i.e., the distance G shown in FIG. 24(a). The relationship between the whole range of rigidity (k) of the tensioner 10G, and the rigidity (k2) of the plate-like elastic member 80 and the rigidity (k1) of the spiral spring 20, is expressed as $1/k=(1/k1)+2\times(1/k2)$ because the tensioner 10G includes two plate-like elastic members 80. Accordingly, as is shown by the characteristic curve k in FIG. 26, there is little variation in the rigidity (k) of the tensioner 10G, which means that the change in rigidity is small. In contrast, the elastic members 80 shown in FIG. 25 slide on the propulsion member 40, and the contact part 27b of the spring-receiving part 71 experiences friction due to vibration (the load from the timing chain [movable body] 4) caused by the engine, and the elastic members 80 are deflected in Direction B/direction opposite to Direction B. This generates a third hysteresis as the difference between the force in Direction B and the force in the direction opposite to Direction B. The reduction in the amount of change of the rigidity change and the third hysteresis cause the tensioner to be more flexible and stable.

In addition, the design of the plate-like elastic member 80 according to this embodiment can optionally be changed in accordance with the characteristics required, such as (1) a change in the shape, dimensions, and/or material of the plate-like elastic member 80, (2) a change in the combination of the thickness or rigidity of the two plate-like elastic members 80; and (3) use of one plate-like elastic member 80 instead of two such members.

(Ninth Embodiment)

Figure 27:
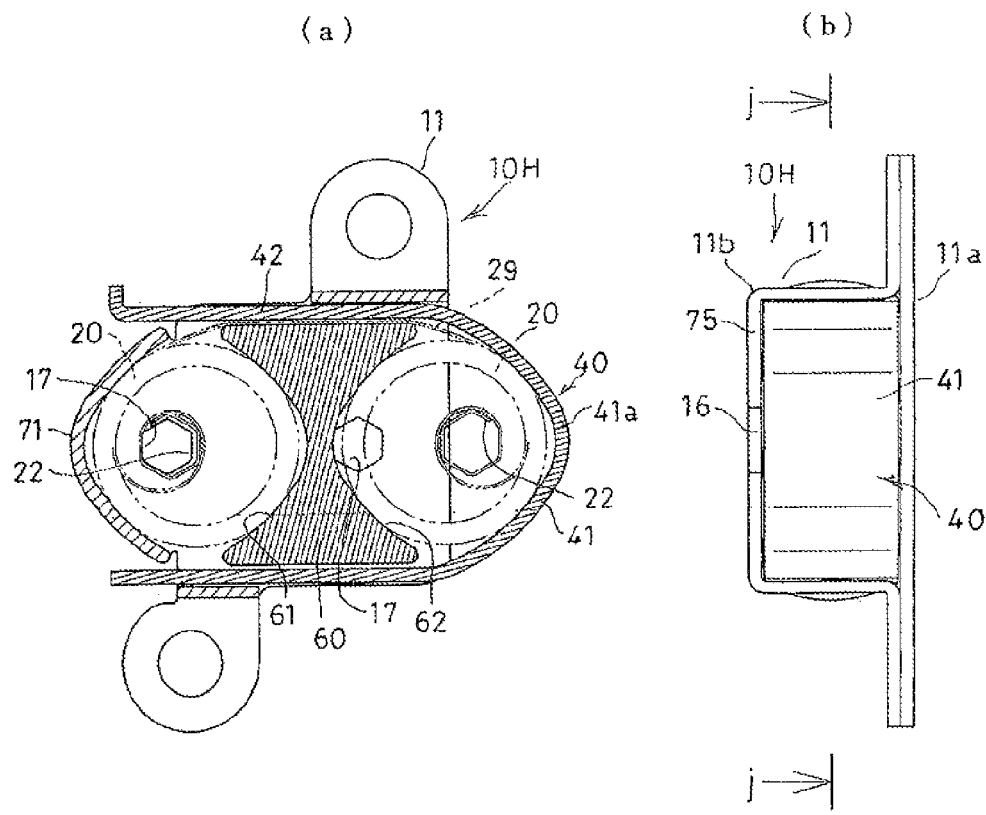

FIG. 27 shows the tensioner 10H used as a load-applying device according to the Ninth Embodiment of the present invention. The tensioner 10H, shown in FIG. 18, has the same configuration as the tensioner 10C as in the Fourth Embodiment. Two spiral springs 20 are arranged side by side (left and right) in the direction of the load received from the chain guide 5 (the timing chain 4 as a movable body), and an intermediate member 60 is disposed between the two spiral springs 20. Also, a propulsion member 40 is arranged at the right-side spiral spring 20 facing the chain guide 5. The intermediate member 60 is provided between two opposing faces 61, 62 that have circular shapes at the left and right sides, respectively, of said intermediate member 60, that are opposite to the two spiral spring 20, and that contact the outer-circumference parts 21 of the spiral springs 20 at said left and right sides over a large area. Also, a covering part 41 of the propulsion member 40 is formed in a circular shape to contact the right-side spiral spring 20 over a large area, and a spring-receiving part 71 opposite to the right-side spiral spring 20 is formed in a circular shape to contact the left-side spiral spring 20 over a large area.

In this embodiment, the two left and right spiral springs 20 are formed by winding one sheet of a thin strip 29 as two spiral shapes on opposite sides of the midpoint of that strip, with the thin strip 29 being continuous between the two spiral springs 20. In this case, the thin strip 29 is wound in opposite directions between the right-side spiral spring 20 and the left-side spiral spring 20. One sheet of the thin strip 29 passes between the intermediate member 60 and a guide part 42 of the propulsion member 40 so as to connect the two left and right spiral springs 20 with each other. This configuration, in which one sheet of a thin strip 29 is wound to form two spiral springs 20, can reduce the number of the thin strips 29 to be used. Also, as is the case in the tensioner 10C of the Fourth Embodiment, the propulsion member 40 operates with the amount of forward movement generated by the combined actions of the diameter expansion of the two left and right spiral springs 20, whereby the propulsion member 40 can function over a larger space.

Figure 28:
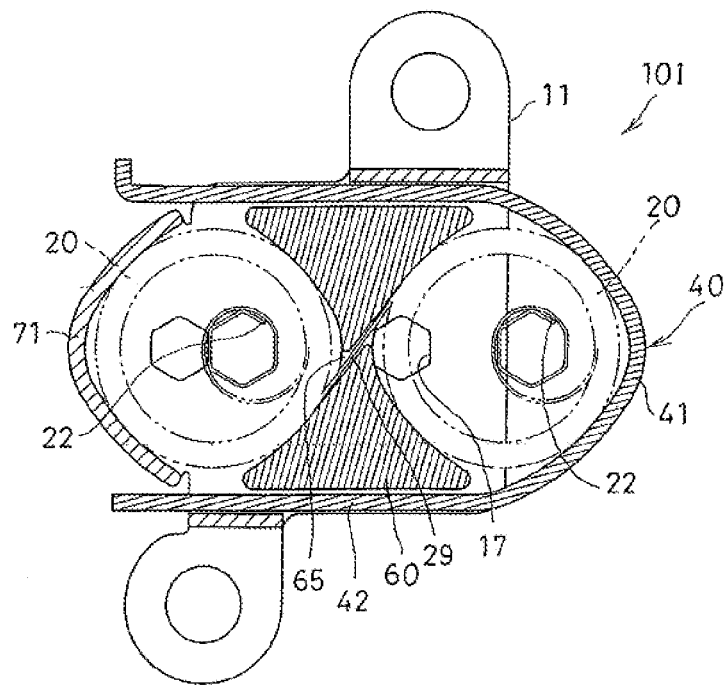
FIG. 28 is a sectional view that shows a modified form of the tensioner according to the Ninth Embodiment.

FIG. 28 shows the tensioner 10I that is a modified form of that of the Ninth Embodiment. This tensioner 10I is formed by winding one sheet of a thin strip 29 in spiral shapes in opposite directions, as is the case in the tensioner 10H in FIG. 27. This allows one sheet of a thin strip 29 to form both a left spiral spring 20 and a right spiral spring 20. In this tensioner 10I, a slit 65 is formed in a vertical direction at the narrowed part of the intermediate part of the intermediate member 60, so that the thin strip 29 is made to pass through the slit 65 so that the left and right spiral springs 20 are on opposite sides of the slit 65. The tensioner 10I operates in the same manner as the tensioner 10H in FIG. 27.

(Tenth Embodiment)

Figure 29:
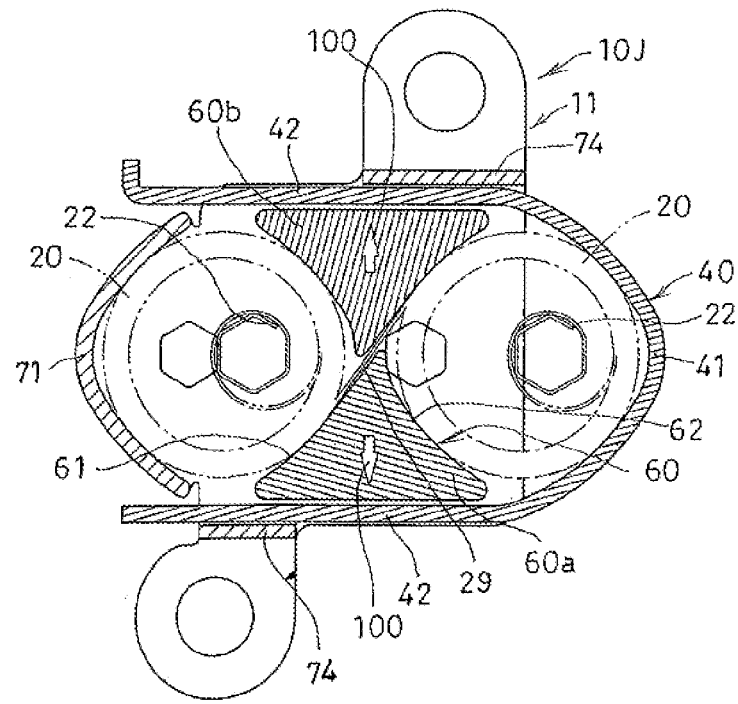
FIG. 29 is a sectional view that shows a tensioner as a load-applying device according to the Tenth Embodiment of the present invention.

FIG. 29 shows the tensioner 10J used as a load-applying device according to the Tenth Embodiment of the present invention. The tensioner 10J is provided with two spiral springs 20 arranged side by side (left and right) in the direction of the load received from the chain guide 5 (the timing chain 4 as a movable body), and an intermediate member 60 is disposed between the two spiral springs 20. A propulsion member 40 as an indirect member is arranged at the right-side spiral spring 20 facing the chain guide 5. The propulsion member 40 includes a covering part 41 and two upper and lower guide parts 42 that extend linearly from the covering part 41 away from the chain guide 5. The guide parts 42 slide on rising parts 74 on the case 11 (lower case part 11b). Left and right spiral springs 20 are formed by winding one sheet of a thin strip 29 in spiral shapes in opposite directions, wherein the thin strip 29 extends between the two spiral springs 20.

The intermediate member 60 between the two spiral springs 20 is bisected in a vertical direction that crosses (is orthogonal to) the load direction from the chain guide 5, which allows the intermediate member 60 to be formed of a split body 60a and a split body 60b. The thin strip 29 extends between the two spiral springs 20 by passing through between the split body 60a and the split body 60b.

In this configuration, if a load is received from the chain guide 5, the left and right spiral springs 20 are pressed to expand the split bodies 60a, 60b in a vertical direction so as to separate from each other. If the split bodies 60a, 60b are expanded, they move in directions (the arrow 100 directions) so as to contact their corresponding guide parts 42 of the propulsion member 40. This causes the guide parts 42 to press the rising parts 74 of the case 11, which increases the friction force between the guide parts 42 and the rising part 74, so that the movement of the guide parts 42 (propulsion members 40) in the load direction from the chain guide 5 is restricted. Thus, the rigidity of the tensioner 10J has nonlinear characteristics that increase the resistance force of the propulsion member 40 in the backward direction, which increases the degree of freedom of design.

(Eleventh Embodiment)

Figure 30:
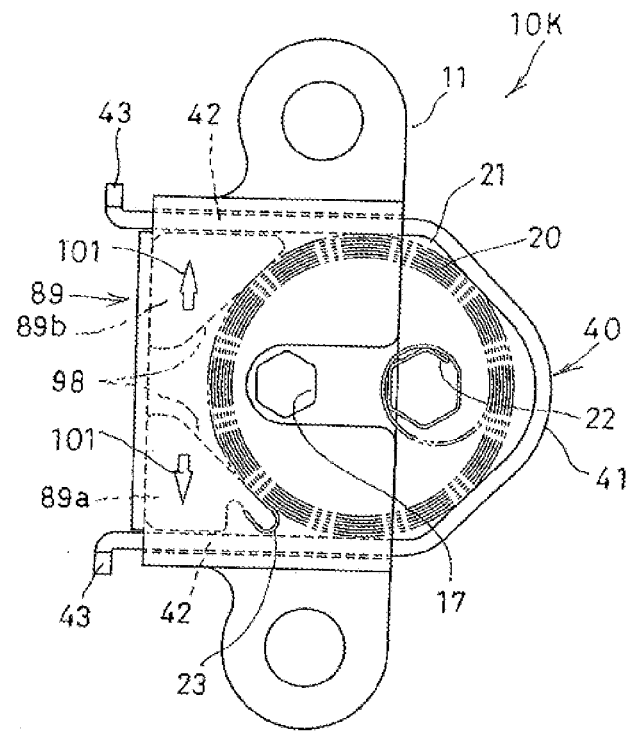
FIG. 30 is a sectional view that shows a tensioner as a load-applying device according to the Eleventh Embodiment of the present invention.
Figure 31:
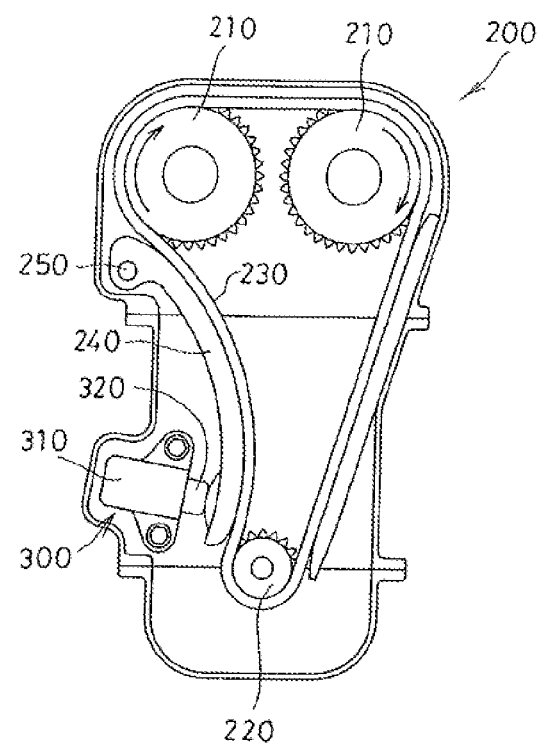
FIG. 31 is a sectional view that shows a state in which a general tensioner has been mounted to an engine main body.

FIG. 30 shows the tensioner 10K used as a load-applying device according to the Eleventh Embodiment of the present invention. The tensioner 10K includes one spiral spring 20 inside the case 11, which is a fixing member. Also, the case 11 is provided with a propulsion member 40 as an indirect member so as to be reciprocally movable, both toward and away from the chain guide 5. The propulsion member 40 has a covering part 41 that covers both the outer peripheral surface 21 of the spiral spring 20, and the two upper and lower guide parts 42 that extend linearly from the covering part 41 away from the chain guide 5.

A receiving block 89 is provided inside the case 11 towards the back side of the case, so that the propulsion member 40 reciprocally moves both toward and away from the chain guide 5. The receiving block 89 is formed by two split bodies 89a, 89b that are bisected in a vertical direction that crosses (is orthogonal to) the direction from which loads are received"?> from the chain guide 5 (the timing chain 4 as a movable body). The respective split bodies 89a, 89b are formed in a triangular shape when viewed from the side, having a slope-like receiving surface 98 that receives the outer peripheral surface 21 of the spiral spring 20. Also, the two split bodies 89a, 89b are provided inside the case 11 so as to be positioned to correspond to the guide parts 42 of the propulsion member 40, and to be reciprocally movable in the directions for contacting the guide parts 42 (arrow-101 directions) in accordance with the expansion and reduction of the diameter of the spiral spring 20. In addition, the outer-end locking part 23 of the spiral spring 20 is locked to the lower split body 89a.

In this configuration, if the spiral spring 20 receives a load from the chain guide 5, the spiral spring 20 is pressed to expand the split bodies 89a, 89b in the vertical direction and to separate from each other. If the split bodes 89a, 89b are expanded, respective split bodies 89a, 89b move in the arrow-100 directions so as to contact the guide parts 42 of the propulsion member 40. This increases the friction force between the guide part 42 and the split bodies 89a, 89b, so as to restrict the movement of the guide parts 42 (propulsion members 40) in the direction from which loads are received from the chain guide 5. Thus, the rigidity of the tensioner 10K has nonlinear characteristics so as to increase the resistance force of the propulsion member 40 in the backward direction, which increases the degree of freedom of design.

(Twelfth Embodiment)

Figure 32:
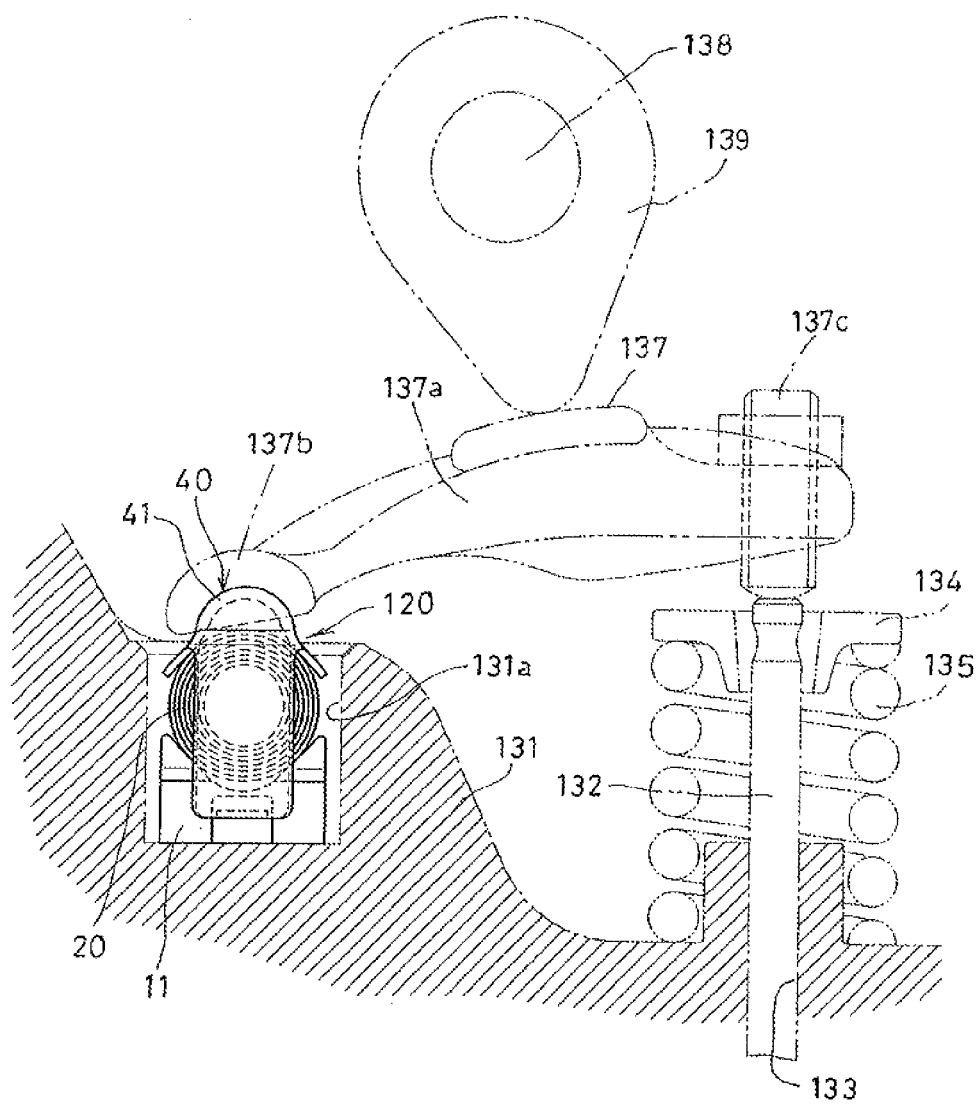
FIG. 32 is a sectional view that shows the arrangement of a lash adjuster as a load-applying device according to the Twelfth Embodiment of the present invention.
Figure 33:
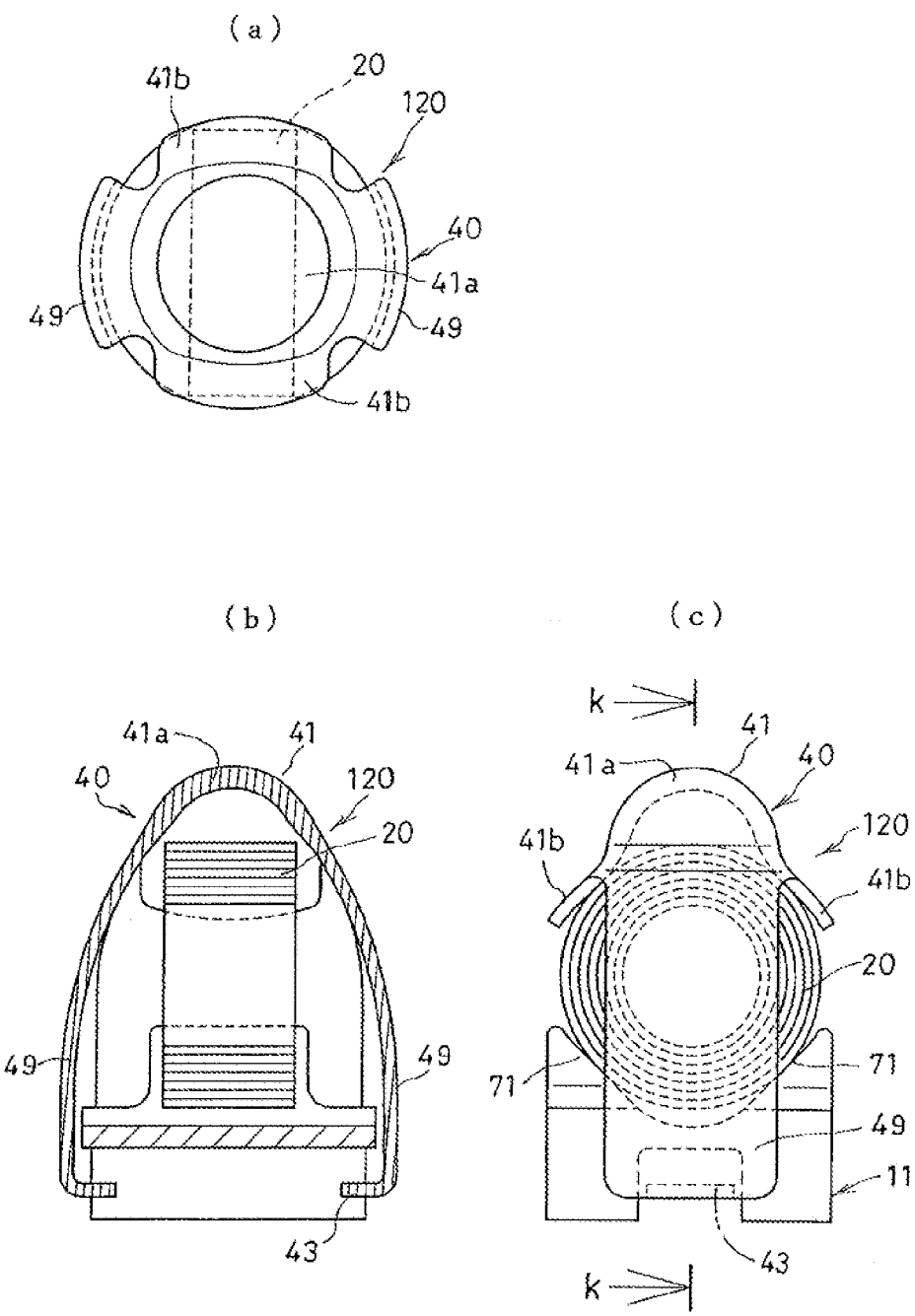
FIG. 33(a) is a plan view of the lash adjuster according to the Twelfth Embodiment.
FIG. 33(b) is a sectional view taken along line k-k of FIG. 33(c)
FIG. 33(c) is a front view of the lash adjuster.

FIGS. 32 and 33 show the Twelfth Embodiment, in which a load-applying device of the present invention is applied to a lash adjuster 120 of a car engine.

As is shown in FIG. 32, the cylinder head 131 of the engine is provided with a valve stem 132 of an air-intake valve (not shown) to open and close a cylinder. The valve stem 132 moves through a through hole 133 of the cylinder head 131 in the vertical direction. A spring retainer 134 is mounted to the upper end of the valve stem 132, and a valve spring 135 that biases the air intake valve (valve stem 132) in the valve-closing direction is provided between the spring retainer 134 and the cylinder head 131.

The lash adjuster 120 is provided to the upper surface of the cylinder head 131 in order to adjust the space between the upper-end face of the valve stem 132 and the rocker arm 137 so that the lash adjuster 120 comes closer to the valve stem 132. In order to mount the lash adjuster 120 to the cylinder head 131, an adjuster-mounting hole 131a is formed on the upper surface of the cylinder head 131.

The rocker arm 137 constitutes a movable body of this embodiment to open and close the air-intake valve via the valve stem 132. The rocker arm 137 is swingably provided above the cylinder head 131 so as to be stretched over and between the upper-end face of the valve stem 132 and the upper end of the lash adjuster 120. A cam 139 that is mounted to the cam shaft 138 contacts the upper surface of the rocker arm 137 so that the rotation of the cam 139 causes the rocker arm 137 to swingably move in a vertical direction, which opens and closes the air-intake valve. In the rocker arm 137, an arm body 137a that the cam 139 contacts is provided with a bowl-like contacting part 137b and a push rod 137c, respectively, at its two ends, wherein the abutting part 137b contacts the lash adjuster 120, and the push rod 137c contacts the valve stem 132.

As is shown in FIG. 33, the lash adjuster 120 includes a spiral spring 20 that is formed by a thin strip being wound in a spiral shape, a case 11 to which the spiral spring 20 is mounted, and a propulsion member 40 that covers the spiral spring 20 at the opposite side of the case 11.

The case 11 constitutes a fixing member that is fixed inside the adjuster-mounting hole 131a formed on the cylinder head 131. A spring-receiving part 71 that receives the outer-circumference part of the spiral spring 20 is formed on the face of the case 11 opposite to the spiral spring 20.

The propulsion member 40, which constitutes an indirect member, includes a covering part 41 that covers the spiral spring 20, and two leg parts 49 that extend from the covering part 41 in the direction opposite to the rocker arm 137. The covering part 41, which contacts the outer-circumference part of the spiral spring 20, includes, as does the covering part 41 of the Second Embodiment, a circular part 41a, and two sloping straight parts 41b that extend from their respective ends of the circular part 41a, so that the outer-circumference part of the spiral spring 20 is received by the circular part 41a and the two sloping straight parts 41b. This causes the propulsion member 40 to reciprocally move in accordance with the expansion and reduction of the diameter of the spiral spring 20. In contrast, the circular part 41a of the covering part 41 contacts the bowl-like contacting part 137b of the rocker arm 137 so as to fit into that bowl-like contacting part 137b, and receives a load caused by the swing operation of the rocker arm 137. In addition, the two leg parts 49 extend from the positions of the circular part 41a being orthogonal to the two sloping straight parts 41b, and the ends of those legs 49 are folded inward to constitute stopper parts 43. The forward movement of the propulsion member 40 stops when the stopper part 43 contacts the case 11.

In this lash adjuster 120, the swing operation of the rocker arm 137 can be controlled by the spring force of the spiral spring 20, which allows the space between the upper face of the valve stem 132 and the rocker arm 137 to be adjusted. This eliminates the need for conventional lash adjuster that uses a hydraulic plunger.

Also, in the lash adjuster 120, the propulsion member 40 can be eliminated so as to have the spiral spring 20 contact the rocker arm 137, and, as in the Fourth Embodiment, multiple spiral springs 20 can be arranged side by side in the direction from which loads are received from the rocker arm 137.

(Thirteenth Embodiment)

Figure 34:
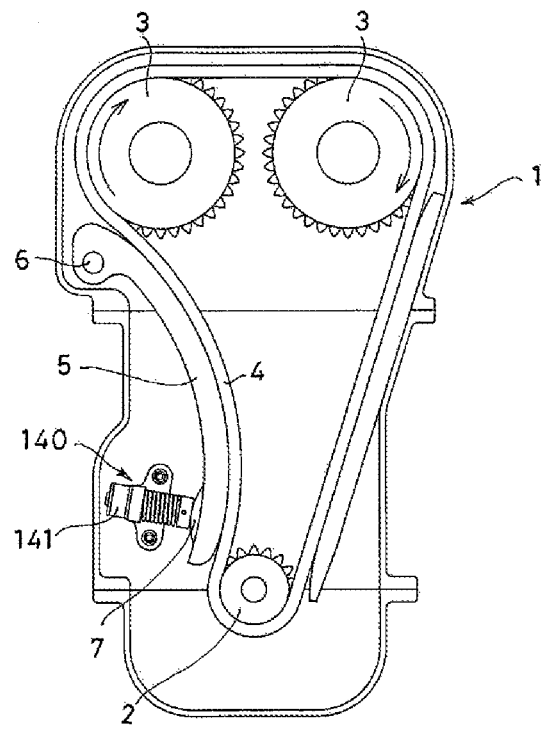
FIG. 34 is a sectional view that shows the state in which a load-applying device according to the Thirteenth Embodiment of the present invention has been mounted to an engine main body.
Figure 35:
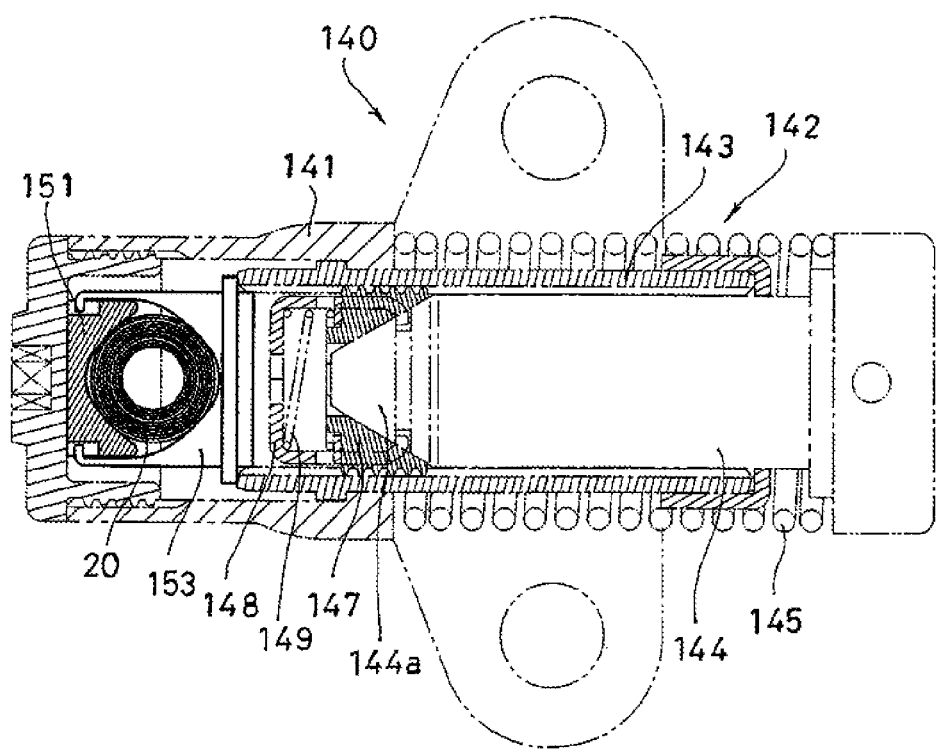
FIG. 35 is a sectional view of the load-applying device according to the Thirteenth Embodiment of the present invention.

FIGS. 34 and 35 show a load-applying device 140 according to the Thirteenth Embodiment of the present invention. As is shown in FIG. 34, the load-applying device 140 is arranged inside the engine main body 1 and is fixed to the inside of an engine block 8 as a fixing member. As is shown in FIG. 1, the engine main body 1 includes, as a movable body, a timing chain 4 that is stretched in an endless manner over a crank sprocket 2 and cam sprockets 3, 3. The timing chain 4 moves while sliding on a chain guide 5 that is oscillatable relative to a support shaft 6. The load-applying device 140 is disposed between the engine block 8 as a fixing member and the timing chain 4 as a movable body.

As is shown in FIG. 35, the load-applying device 140 includes a case 141 that is fixed to the engine block 8, an adjusting mechanism 142 that is mounted to the case 141 in the device's longitudinal direction, and a spiral spring 20 that is arranged inside the case 141. The adjusting mechanism 142 configured includes a cylindrical support shaft 143 that is inserted into the case 141 in the longitudinal direction, a propulsion shaft 144 that is inserted into the support shaft 143 in the axial direction so as to retractably move from the case 141, and a coil spring 145 that biases the propulsion shaft 144. The distal end of the propulsion shaft 144 contacts the timing chain 4 (chain guide 5), so that the propulsion shaft 144 moves reciprocally in response to the movement of the timing chain 4 in the longitudinal direction, which gives tension to the timing chain 4.

Moreover, the adjusting mechanism 142 includes a ratchet 147 that is provided inside the case 141 and is arranged at the rear end (left side) of the support shaft 143 so as to contact a tapered surface 144*a* at the rear end (left end) of the propulsion shaft 144. A holding frame 148 is inserted into the support shaft 143, and a ratchet spring 149 is arranged between the holding frame 148 and the ratchet 147, which allows the ratchet 147 to be biased in the direction of contact with the propulsion shaft 144.

The spiral spring 20 is sandwiched between a receiving member 151 and a propulsion member 153, and the circumference part of the spiral spring 20 contacts the receiving member 151 and the propulsion member 153. In this case, the receiving member 151 is arranged inside the case 141 at the rear end of the case, and the propulsion member 153 is arranged so as to contact the rear end part of the support shaft 143.

In the load-applying device 140 having the above configuration, if the elongation of timing chain 4 in the longitudinal direction results in a large change of the length of the chain 4, the elongated amount is absorbed by the adjusting mechanism 142, which has a ratchet 147. This allows the damping of the load from the timing chain 4 to the spiral spring 20. Thus, both a response to permanent elongation of the timing chain 4 and a damping effect can be achieved simultaneously.

DESCRIPTION OF REFERENCE SIGNS

10, 10A, 10B, 10C, 10D, 10E, 10F, 10G, 10H, 10I, 10J, 10K tensioner (load-applying device)
4 timing chain (movable body)
5 chain guide (guide member (indirect member))
7 receiving part
11 case
17 temporary tacking hole
18 spring-receiving part (receiving part)
20 spiral spring
21 circumference part
22 winding part
29 thin strip
30 winding member
40 propulsion member (indirect member)
41 covering part
41*a* circular part
41*b* sloping straight part
50 damping member
53 projecting and recessed part
60 intermediate member
60*a*, 60*b* split body
71 spring-receiving part (receiving part)
71*a* circular part
71*b* sloping straight part
80 plate-like elastic member
85 intermediary part
86 both ends
87 space
89 receiving block
89*a*, 89*b* split body
120 lash adjuster (load-applying device)
140 load-applying device
142 adjusting mechanism in the longitudinal direction

The invention claimed is:

1. A load-applying device comprising:
a spiral spring that is formed from a thin strip that is wound multiple times in a spiral shape;
a movable body; and
a fixing member;
said spiral spring being disposed between said movable body and said fixing member, in a manner capable of performing a diameter reduction operation and a diameter expansion operation, and an outer-circumference part of said spiral spring contacting said movable body and said fixing member directly, or indirectly, such that said moveable body and said fixing member contact said outer-circumference part of said spiral spring with respect to a radial direction of said spiral spring.

2. The load-applying device according to claim 1, wherein an inner-end part of said spiral spring is a winding part for winding the spiral spring, and said winding part is movable inside said spiral shape in response to winding of the spiral spring, and diameter expansion and diameter reduction of the spiral spring.

3. The load application device according to claim 1, wherein the outer circumference part of said spiral spring indirectly contacts said movable body via an indirect member, and/or said fixing member via a plate-like elastic member.

4. The load-applying device according to claim 3, wherein expansion of the diameter of said spiral spring causes the outer-circumference part of said spiral spring to contact said fixing member, said movable body, said indirect member or said plate-like elastic member, respectively, at at least two positions each.

5. The load-applying device according to claim 3, wherein a receiving part having a triangular shape, a circular shape, or a linear shape is formed at said fixing member's part, said indirect member's part or said plate-like elastic member, which is opposite to the outer-circumference part of said spiral spring.

6. The load-applying device according to claim 3, wherein a damping member is disposed between the outer-circumference part of said spiral spring, and either said indirect member and/or said fixing member.

7. The load-applying device according to claim 3, wherein a plurality of said spiral springs are arranged between said fixing member and said indirect member in the direction from which loads are received from said movable body, and an intermediate member is also disposed between said spiral springs that are adjacent to each other.

8. The load-applying device according to claim 3, wherein said plate-like elastic member contacts said fixing member or said indirect member at both ends of said plate-like elastic member in the longitudinal direction of said plate-like elastic member, and the intermediary part of said plate-like elastic member in the longitudinal direction thereof is opposite to said fixing member or said indirect member in such a manner that a space is formed between the intermediary part of said plate-like elastic member in the longitudinal direction thereof, and said fixing member or said indirect member, the space being deformable due to deflection of said platelike elastic member.

9. The load-applying device according to claim 7, wherein each of said multiple spiral springs comprises a thin strip that extends between said spiral springs.

10. The load-applying device according to claim 7, wherein said fixing member or said intermediate member is split in a direction that crosses the direction in which a load is received from said movable body, so as to form multiple split bodies, with each of said split bodies being reciprocally movable in the direction to contact said indirect member in accordance with the expansion and reduction of the diameter of said spiral spring.

11. The load-applying device according to claim 1, wherein an adjusting mechanism is disposed in the longitudinal direction of the load-applying device between said fixing member and said movable body.

12. The load-applying device according to claim 1, and further including a temporary fixing means that maintains said spiral spring in a wound state.

13. The load-applying device according to claim 1, wherein said movable body is a timing chain or a timing belt that moves in an endless manner inside a car engine.

14. The load-applying device according to claim 1, wherein said movable body is a rocker arm that swingably moves to open and close an air-intake valve of a car engine.

* * * * *